US011682180B1

(12) United States Patent
Willkie

(10) Patent No.: US 11,682,180 B1
(45) Date of Patent: Jun. 20, 2023

(54) ANCHORING VIRTUAL CONTENT TO PHYSICAL SURFACES

(71) Applicant: QUALCOMM Incorporated, San Diego, CA (US)

(72) Inventor: Chad Willkie, Cardiff by the Sea, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/547,068

(22) Filed: Dec. 9, 2021

(51) Int. Cl.
*G06T 19/00* (2011.01)
*G06T 7/70* (2017.01)
*G06V 10/44* (2022.01)
*G06V 20/20* (2022.01)
*G06T 7/12* (2017.01)

(52) U.S. Cl.
CPC .............. *G06T 19/006* (2013.01); *G06T 7/12* (2017.01); *G06T 7/70* (2017.01); *G06V 10/44* (2022.01); *G06V 20/20* (2022.01); *G06T 2200/04* (2013.01); *G06T 2207/20092* (2013.01)

(58) Field of Classification Search
CPC ........... G06T 19/006; G06T 7/12; G06T 7/70; G06T 2200/04; G06T 2207/20092; G06V 10/44; G06V 20/20
See application file for complete search history.

(56) References Cited

U.S. PATENT DOCUMENTS

| | | | | |
|---|---|---|---|---|
| 9,286,727 B2* | 3/2016 | Kim | .................. | G06F 3/147 |
| 9,520,002 B1* | 12/2016 | Gavriliuc | .................. | H04L 51/52 |
| 9,734,634 B1* | 8/2017 | Mott | .................. | G06F 3/002 |
| 10,319,150 B1* | 6/2019 | Canada | .................. | G06T 19/006 |
| 10,373,381 B2* | 8/2019 | Nuernberger | .................. | G06F 3/011 |
| 10,672,191 B1* | 6/2020 | Besecker | .................. | G06T 19/006 |
| 10,726,597 B1* | 7/2020 | Chang | .................. | G06V 10/235 |
| 11,210,863 B1* | 12/2021 | Yan | .................. | G06T 19/20 |
| 11,244,514 B2* | 2/2022 | Araújo et al. | .................. | G06F 3/011 |
| 2012/0249741 A1* | 10/2012 | Maciocci | .................. | G06T 19/006 348/51 |
| 2013/0135295 A1* | 5/2013 | Li | .................. | H04N 13/156 345/419 |
| 2013/0147798 A1* | 6/2013 | Karsch | .................. | G06T 19/006 345/420 |

(Continued)

OTHER PUBLICATIONS

International Search Report and Written Opinion—PCT/US2022/078235—ISA/EPO—dated Jan. 30, 2023.

*Primary Examiner* — Motilewa Good-Johnson
(74) *Attorney, Agent, or Firm* — Polsinelli/Qualcomm

(57) ABSTRACT

Systems and techniques are provided for rendering virtual content in a scene. An example method includes determining a surface plane in a scene of a physical environment; rendering virtual content in a perspective at a location in the scene; rendering a content placement indicator associated with the virtual content on a first space of the surface plane, the content placement indicator indicating the first space for placement of the virtual content; determining one or more locations of one or more objects on a surface associated with the surface plane; and responsive to an input, rendering the content placement indicator on a second space of the surface plane, the second space being determined based on the one or more locations and input, the content placement indicator indicating the second space for placement of the virtual content.

32 Claims, 13 Drawing Sheets

(56) References Cited

U.S. PATENT DOCUMENTS

| | | | | |
|---|---|---|---|---|
| 2014/0306993 | A1* | 10/2014 | Poulos | G06T 19/006 |
| | | | | 345/633 |
| 2016/0179336 | A1* | 6/2016 | Ambrus | G06F 3/04842 |
| | | | | 715/768 |
| 2017/0270713 | A1* | 9/2017 | Dooley | G06F 3/011 |
| 2017/0270715 | A1* | 9/2017 | Lindsay | G06T 7/70 |
| 2017/0287218 | A1* | 10/2017 | Nuernberger | G06F 3/04845 |
| 2018/0045963 | A1* | 2/2018 | Hoover | G06F 3/011 |
| 2018/0096528 | A1* | 4/2018 | Needham | G06T 7/70 |
| 2018/0350099 | A1* | 12/2018 | Yerkes | G06T 11/40 |
| 2018/0350145 | A1* | 12/2018 | Byl | G06T 19/006 |
| 2019/0325653 | A1* | 10/2019 | Yip | G06F 3/04883 |
| 2019/0392213 | A1* | 12/2019 | Ulbricht | G06K 9/6267 |
| 2020/0082633 | A1* | 3/2020 | Rom | G06T 17/10 |
| 2020/0090407 | A1* | 3/2020 | Miranda | G06T 7/33 |
| 2020/0111261 | A1* | 4/2020 | Fang | H04L 9/3239 |
| 2020/0151965 | A1* | 5/2020 | Forbes | G06T 19/006 |
| 2020/0160602 | A1* | 5/2020 | Ghatak | G06Q 30/0255 |
| 2020/0226823 | A1* | 7/2020 | Stachniak | G06T 19/006 |
| 2020/0402316 | A1 | 12/2020 | Warren et al. | |
| 2021/0090315 | A1 | 3/2021 | Gladkov et al. | |
| 2021/0192847 | A1* | 6/2021 | Nagaraja | G06T 19/006 |
| 2021/0272537 | A1* | 9/2021 | Mak | G06F 3/011 |
| 2021/0295602 | A1* | 9/2021 | Scapel | G06T 7/70 |
| 2021/0327146 | A1* | 10/2021 | Buerli | G06F 3/04815 |
| 2021/0375049 | A1* | 12/2021 | Syed | G06F 3/04815 |
| 2021/0406541 | A1* | 12/2021 | Ulbricht | G06V 20/20 |
| 2022/0130126 | A1* | 4/2022 | Delgado | G06F 3/04842 |

\* cited by examiner

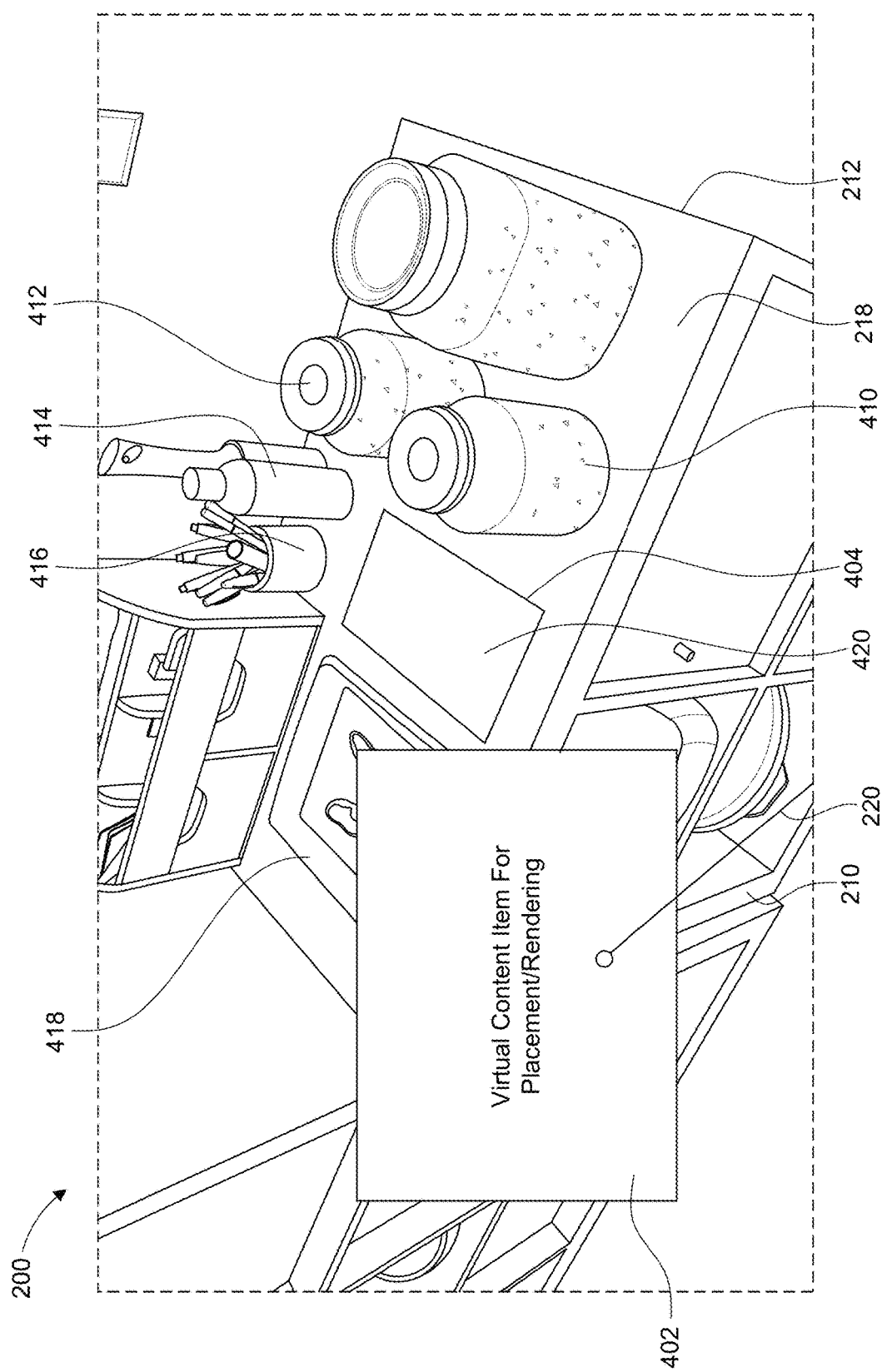

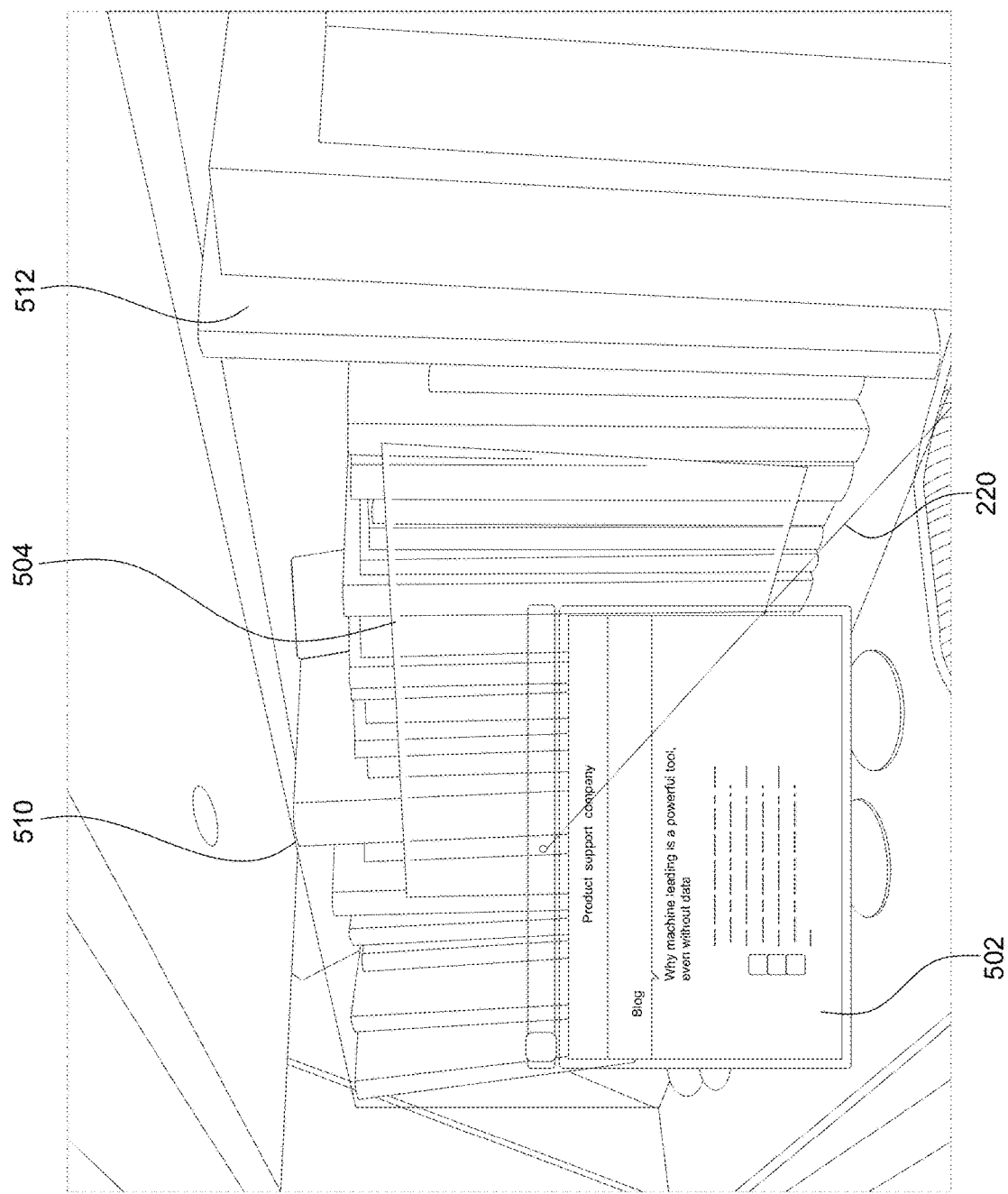

ANCHORING VIRTUAL CONTENT TO PHYSICAL SURFACES

TECHNICAL FIELD

The present disclosure generally relates to organizing and rendering virtual content for extended reality. For example, aspects of the present disclosure relate to techniques and systems for placing virtual content on physical surfaces.

BACKGROUND

Extended reality (e.g., augmented reality, virtual reality, mixed reality, etc.) devices, such as smart glasses and head-mounted displays (HMDs), generally implement cameras and a variety of sensors to track the position of the extended reality (XR) device and other objects within the physical environment. The XR devices can use such tracking information to provide a user of the XR device a realistic XR experience. For example, an XR device can allow a user to experience or interact with immersive virtual environments or content. To provide realistic XR experiences, XR technologies can integrate virtual content with the physical world. In some cases, XR technologies can match the relative pose and movement of objects and devices in the physical world. For example, an XR device can use tracking information to calculate the relative pose of devices, objects, and/or maps of the real-world environment in order to match the relative position and movement of the devices, objects, and/or the real-world environment. Using the pose and movement of one or more devices, objects, and/or the real-world environment, the XR device can render content relative to the real-world environment in a convincing manner. The relative pose information can be used to match virtual content with the user's perceived motion and the spatio-temporal state of the devices, objects, and real-world environment.

BRIEF SUMMARY

In some examples, systems, apparatuses, processes (also referred to as methods), and computer-readable media (collectively referred to as "systems and techniques") are described for anchoring virtual content to physical surfaces. According to at least one illustrative example, a method is provided for rendering virtual content in a scene of a physical environment. In some examples, the method can include determining at least one surface plane in the scene of the physical environment; rendering, via a computing device, a virtual content item in a first perspective at a first location in the scene; rendering a content placement indicator associated with the virtual content item on a first space of the at least one surface plane, the content placement indicator indicating at least part of the first space for placement of the virtual content item; determining one or more locations of one or more objects on a surface associated with the at least one surface plane; and in response to a user input, rendering the content placement indicator on a second space of the at least one surface plane, wherein the second space of the at least one surface plane is determined based on the one or more locations and the user input, the content placement indicator indicating at least part of the second space for placement of the virtual content item.

According to at least one illustrative example, a non-transitory computer-readable medium is provided for rendering virtual content in a scene of a physical environment. In some aspects, the non-transitory computer-readable medium can include instructions that, when executed by one or more processors, cause the one or more processors to determine at least one surface plane in the scene of the physical environment; render a virtual content item in a first perspective at a first location in the scene; render a content placement indicator associated with the virtual content item on a first space of the at least one surface plane, the content placement indicator indicating at least part of the first space for placement of the virtual content item; determine one or more locations of one or more objects on a surface associated with the at least one surface plane; and in response to a user input, render the content placement indicator on a second space of the at least one surface plane, wherein the second space of the at least one surface plane is determined based on the one or more locations and the user input, the content placement indicator indicating at least part of the second space for placement of the virtual content item.

According to at least one illustrative example, an apparatus is provided for rendering virtual content in a scene of a physical environment. In some aspects, the apparatus can include memory having stored thereon computer-readable instructions and one or more processors configured to determine at least one surface plane in the scene of the physical environment; render a virtual content item in a first perspective at a first location in the scene; render a content placement indicator associated with the virtual content item on a first space of the at least one surface plane, the content placement indicator indicating at least part of the first space for placement of the virtual content item; determine one or more locations of one or more objects on a surface associated with the at least one surface plane; and in response to a user input, render the content placement indicator on a second space of the at least one surface plane, wherein the second space of the at least one surface plane is determined based on the one or more locations and the user input, the content placement indicator indicating at least part of the second space for placement of the virtual content item.

According to another illustrative example, another apparatus for rendering virtual content in a scene of a physical environment can include means for determining at least one surface plane in the scene of the physical environment; rendering, via a computing device, a virtual content item in a first perspective at a first location in the scene; rendering a content placement indicator associated with the virtual content item on a first space of the at least one surface plane, the content placement indicator indicating at least part of the first space for placement of the virtual content item; determining one or more locations of one or more objects on a surface associated with the at least one surface plane; and in response to a user input, rendering the content placement indicator on a second space of the at least one surface plane, wherein the second space of the at least one surface plane is determined based on the one or more locations and the user input, the content placement indicator indicating at least part of the second space for placement of the virtual content item.

In some aspects, the method, non-transitory computer-readable medium, and apparatuses described above can include, in response to an additional user input requesting placement of the virtual content item on the second space, rendering the virtual content item in a second perspective at a second location in the scene based on the content placement indicator. In some examples, the second location can be within the second space. In some cases, the method, non-transitory computer-readable medium, and apparatuses described above can include determining the second perspective based on a perspective of the second space.

In some aspects, the method, non-transitory computer-readable medium, and apparatuses described above can include determining a first surface plane and a second surface plane of the at least one surface plane, the first space being associated with the first surface plane and the second space being associated with the second surface plane; and determining the second perspective based on a perspective of the second surface plane.

In some examples, rendering the content placement indicator on the second space can include determining an overlap of the virtual content item with the second surface plane, and upon determination that the overlap exceeds a first threshold, switching to rendering the content placement indicator on the second space associated with the second surface plane.

In some examples, the first space and the second space are associated with a first surface plane of the at least one surface plane. In some aspects, the method, non-transitory computer-readable medium, and apparatuses described above can include detecting one or more objects, wherein the one or more objects occlude at least part of the first surface plane; and segmenting the first surface plane into at least a first segment and a second segment based at least on an occluded part of the first surface plane. In some examples, the first space is associated with the first segment and the second space is associated with the second segment.

In some cases, segmenting the first surface plane into at least the first segment and the second segment can include determining a fit of the virtual content item rendered in a perspective of the first surface plane in the first segment and the second segment.

In some aspects, the method, non-transitory computer-readable medium, and apparatuses described above can include changing an aspect ratio of the virtual content item between the first segment and the second segment.

In some aspects, the method, non-transitory computer-readable medium, and apparatuses described above can include prior to rendering the content placement indicator on the second space, rendering the virtual content item in a third perspective at a third location in the scene based on the content placement indicator. In some examples, the third location can be within the first space.

In some aspects, the method, non-transitory computer-readable medium, and apparatuses described above can include, in response to the user input, moving the content placement indicator within the first space prior to rendering the content placement indicator on the second space.

In some cases, determining the at least one surface plane in the scene can include applying an offset to the at least one surface plane normally to at least one surface and toward a view point of a user associated with the computing device.

In some cases, determining the at least one surface plane in the scene can include determining one or more edges of the one or more objects in the scene, and determining the at least one surface plane based on the one or more edges of the one or more objects in the scene.

In some cases, rendering the content placement indicator can include rendering a pattern on the at least one surface plane. In some examples, the pattern can include at least one of a highlight, an outline, a color, a shade, a shadow, a hatching, and a gradient.

In some cases, determining the at least one surface plane in the scene can include determining one or more surfaces of the one or more objects in the scene, and determining the at least one surface plane based on the one or more surfaces of the one or more objects in the scene.

In some aspects, an apparatus can be, or can be part of, a camera (e.g., an IP camera), a mobile device (e.g., a mobile telephone or so-called "smartphone," or other mobile device), a smart wearable device, an extended reality device (e.g., a virtual reality (VR) device, an augmented reality (AR) device, or a mixed reality (MR) device), a personal computer, a laptop computer, a multi-camera system, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 4 is a diagram illustrating an example adjustment of an aspect ratio of a content placement indicator to fit within an available space on a surface plane, in accordance with some examples of the present disclosure;

FIG. 5A is a diagram illustrating an example surface plane and content placement indicator that are rendered at a certain position relative to a surface that is complex, in accordance with some examples of the present disclosure;

DETAILED DESCRIPTION

Figure 1:
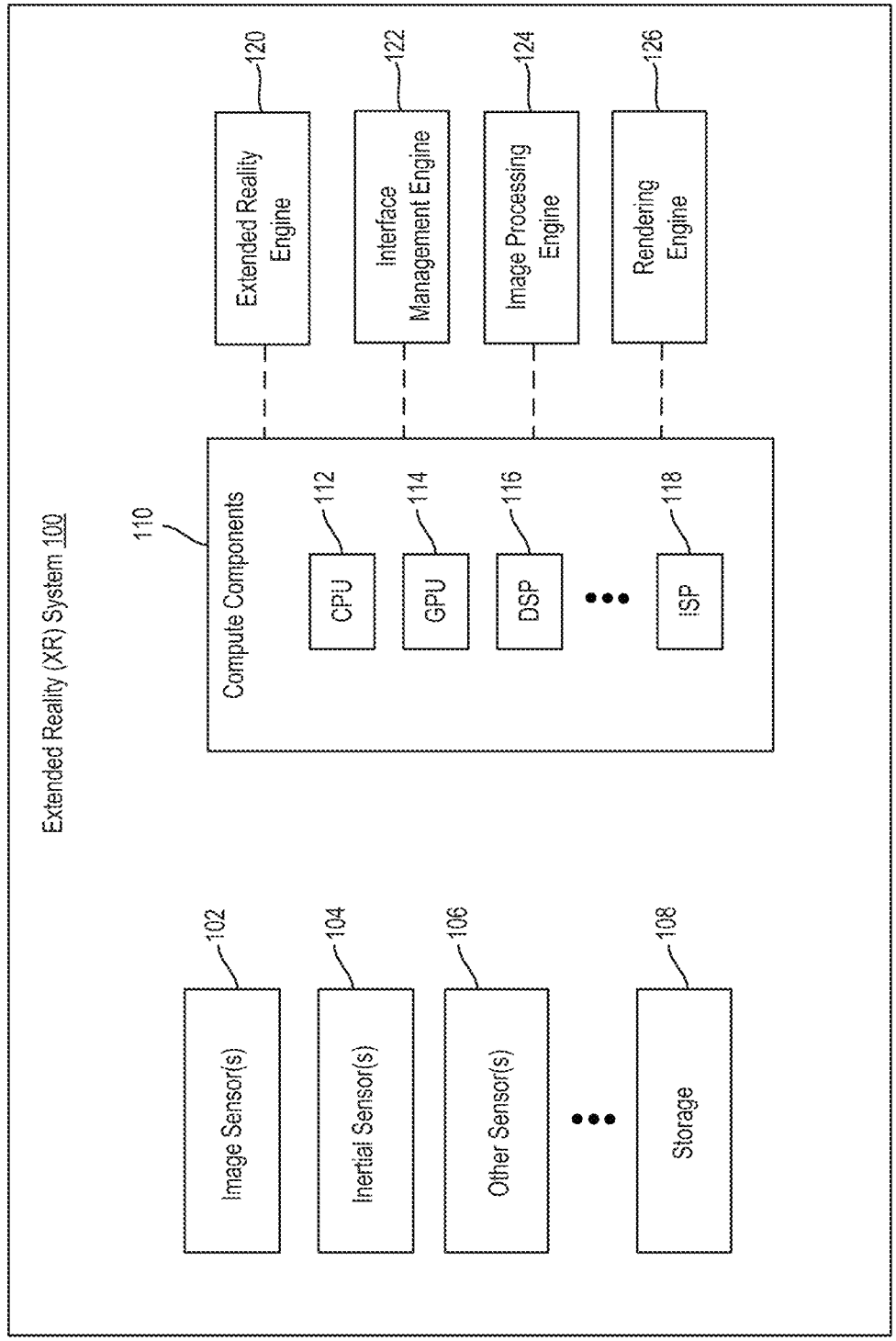
FIG. 1 is a simplified block diagram illustrating an example extended reality system, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the scope of the application as set forth in the appended claims.

As previously explained, extended reality (XR) devices can allow a user to experience or interact with immersive virtual environments or content. To provide realistic XR experiences, XR devices can integrate virtual content with a scene or image of the physical world captured by the XR device (e.g., via one or more cameras of the XR device). In some cases, an XR device can perform three-dimensional registration of virtual and real objects. In some cases, the XR device can match the relative pose and movement of objects and the XR device in the physical world. For example, the XR device can use tracking information to calculate the relative pose of the XR device, objects, and/or maps of the real-world environment in order to match the relative position and movement of the XR device, objects, and/or the real-world environment. Using the pose and movement of the XR device, one or more objects, and/or the real-world environment, the XR device can render content relative to the real-world environment in a convincing manner. The relative pose information can be used to match virtual content with the user's perceived motion and the spatio-temporal state of the XR device, the objects, and the real-world environment.

When presenting virtual content to a user in a scene or image of the physical world, an XR device may configure the virtual content to appear to the user as if the rendered virtual content is located in a certain space/region on the physical world. In some cases, it can be difficult for the XR device to determine which spaces/regions in the physical world are suitable (e.g., unobstructed and/or unoccupied by an object in the physical world, free of clutter, etc.) and/or have a suitable surface for depicting/rendering the virtual content. Often, the XR device can have difficulty managing and/or organizing the virtual content rendered by the XR device in a particular environment, and/or avoiding issues when presenting the virtual content in the particular environment such as, for example, obstructions caused by objects in the environment and/or aspects of the environment (e.g., the layout of the environment, the configuration of surfaces and/or spaces in the environment, the placement of any objects in the environment, etc.), clutter caused by the rendered virtual content and objects in the environment, etc.

In some examples, an XR device may try to organize virtual content rendered by the XR device by placing the virtual content in certain spaces on the physical world. For example, an XR device may try to organize virtual content by appending or anchoring the virtual content to a certain area/region in the physical world. In some cases, the XR device can receive a user input requesting a certain organization and/or placement of virtual content. In response to the user input, the XR device can append or anchor the virtual content to a certain area/region in the physical world. In other words, virtual content may be rendered by the XR device such that it has a fixed spatial relationship to a particular space/region in a scene of the physical world. The particular space/region may correspond to one or more real objects in the physical world. As will be described in detail below, the correspondence may be by association with a surface of the one or more objects. In some examples, a three-dimensional orientation of the surface in the scene of the physical world may be used to render a perspective view of the virtual content such that the virtual content appears aligned with the surface in three dimensions. In some cases, the virtual content may be anchored to the surface such that the fixed spatial relationship between the rendered virtual content and the surface is maintained under movement of the user and/or the view. In some cases, the perspective view of the virtual content is adapted to a change of the user's view and/or position in the physical world.

As further described herein, in some examples, the XR device can depict a content placement indicator suggesting and/or identifying a suitable and/or suggested area or region for placing the virtual content in the scene of the physical world. In some cases, a user may manually move (e.g., via a user input provided to the XR device) a content placement indicator for the virtual content. In some examples, the content placement indicator can be moved in response to a user input (e.g., the user dragging a virtual content item across the scene, etc.). The virtual content item can initially be rendered in a first perspective, such as in plan view, at a first location in the scene. The first location may be predefined or manually determined by the user. The virtual content item can be rendered with an initial size which may be predefined and/or user-defined. The initial size may be adapted through user input and/or in response to the user input (e.g., a dragging input, etc.). The content placement indicator can represent and/or identify an area or region depicted within a surface and/or surface plane in the physical environment, where certain virtual content can be placed and rendered by the XR device. The surface plane may be a virtual surface plane associated with an actual surface of an object in the physical environment. In some cases, the surface plane may be aligned with the surface of the object. In some cases, the surface plane may be offset from the surface of the object. The offset may be toward a point a view of the user. In other cases, the surface plane may coincide with the surface of the object.

The content placement indicator can include a visual element such as a visual outline, window, hatching, shape (e.g., bounding box or any other shape), etc., that indicates at least part of a particular space of a surface (and/or surface plane) of the physical environment, where the virtual content item can be placed/rendered for the user. In some cases, the content placement indicator can include a visual element that depicts a fit and placement of the virtual content item on a particular space of a surface in the physical environment. The content placement indicator (e.g., the visual element) can have a same or similar shape and/or configuration as the virtual content. Thus, the content placement indicator (e.g., the visual element) can depict/render to the user how and/or where the virtual content would appear in and/or relative to the physical environment.

When rendering the virtual content in the physical environment, the XR device can place and render the virtual content at/within the content placement indicator. To the user, the virtual content can appear to be located within the physical environment, at the space (e.g., area or region) associated with, e.g., outlined or bounded by, the content placement indicator. In some cases, the process for manually moving a content placement indicator for the virtual content can be cumbersome and imprecise. For example, if the user wants to append or anchor virtual content to a surface in the physical environment that is cluttered (e.g., crowded with objects, messy, limited in available space, etc.) and/or complex (e.g., uneven, rough/coarse/bumpy/textured, elevated, irregular, asymmetrical, curved, three-dimensional, of a certain geometry, etc.), it may be difficult to estimate if the virtual content will fit (with a minimum size, e.g., for readability of text content) in the surface and/or within any suitable space (e.g., a space unoccupied or unobstructed by an object, a space capable of fitting at least a threshold amount of the virtual content, etc.) in the surface. In some cases, it can be difficult to determine whether the virtual content may better fit in a particular surface or surface plane or a different surface or surface plane, or whether placing virtual content within a particular surface may occlude any objects in that surface that the user may not want occluded by the virtual content (e.g., that the user may want to remain visible to the user once the virtual content is placed and rendered on the surface).

Systems, apparatuses, processes (also referred to as methods), and computer-readable media (collectively referred to as "systems and techniques") are described herein for placing virtual content on and/or relative to surfaces in physical environments. In some examples, an XR device can identify surface planes (planes on/of or relative to respective surfaces of one or more objects) in a physical environment on which the user can anchor (e.g., place/attach) virtual content for rendering by the XR device. To this end, the XR device can identify one or more objects in the physical environment, determine the relative pose of the one or more objects with respect to the XR device, and identify one or more surfaces of the one or more objects. The XR device can provide the user an indication and/or suggestion of the identified surface planes to assist the user in selecting and/or accepting a particular surface plane on which to place/depict virtual content. The indication can be in the form of a content placement indicator which may highlight the entire or only part of the surface plane or may indicate the entire or only part of the surface plane for placement of the virtual content, e.g., by means of a visual outline. The XR device can render the virtual content in a manner that depicts the virtual content on any of such surface planes selected and/or accepted by the user for the placement and rendering of the virtual content.

For example, in some cases, as the user of the XR device moves a rendering of a content placement indicator so as to appear to the user as if the content placement indicator is being moved through/across a scene of the physical environment, the XR device can detect and highlight any suitable surface planes in the physical environment which the virtual content can be anchored to for rendering. The content placement indicator can represent a space on the surface plane for placement of the virtual content within the physical environment. In some examples, the content placement indicator can represent and/or identify an outline, shape, and/or configuration of the virtual content to indicate a corresponding space of a surface plane in the physical environment that would be occupied by the virtual content (e.g., that would be used to render the virtual content) if the virtual content is snapped to (e.g., placed at/within, anchored to, etc.) the content placement indicator at the depicted/identified position of the content placement indicator. The user can use the content placement indicator to determine where to place the virtual content within the surface plane in physical environment.

In some examples, the user can select and/or accept to place the virtual content in/within the content placement indicator at a corresponding location (e.g., at a depicted/identified location) of the content placement indicator within a surface plane which can be highlighted by the XR device. For example, the user can select a current position (e.g., a depicted/identified position) of the content placement indicator to anchor the virtual content to the content placement indicator at the selected position of the content placement indicator in the scene or image of the physical environment (e.g., in/within the surface plane). The XR device can render the virtual content within the content placement indicator at the selected position of the content placement indicator in the scene of the physical environment (e.g., in/within the surface plane). For example, the XR device can render the virtual content within the content placement indicator at a particular location of the surface plane corresponding to the selected position of the content placement indicator.

In some cases, the XR device can highlight (or otherwise visually depict/identify) a surface plane(s) in the physical environment. In some examples, the XR device can highlight an entire or part of a surface plane(s) to provide the content placement indicator. Alternatively or additionally, a (further) content placement indicator, e.g., in the form of a visual outline, may be rendered in/on the surface plane(s) to indicate a particular space of the surface plane for placement of the virtual content item. The XR device can change the surface plane highlighted (and/or the highlighted part of a surface plane) as the XR device moves (e.g., based on a user input, a device setting, a user preference, and/or a dynamic adjustment decision) the content placement indicator through/across the scene of the physical environment. In some examples, the XR device can identify a number of candidate surface planes in the physical environment and highlight a particular surface plane in the physical environment. When the XR device moves the content placement indicator through/across the scene of the physical environment, the XR device can highlight a different surface plane from the candidate surface planes.

The XR device can highlight an entire surface plane or a portion of the surface plane. In some examples, the XR device can highlight an entire surface plane, and present to the user a content placement indicator within the highlighted surface plane. In some cases, the presented content placement indicator can include a smaller highlight (e.g., a highlighted portion/region) within the highlighted surface plane, a visual indicator within the highlighted surface plane, a projected slot/area within the highlighted surface plane, a visual outline (and/or boundaries) of the virtual content within the highlighted surface plane, and/or a representation of a virtual content placement within the highlighted surface plane. The content placement indicator (e.g., the smaller highlight, visual indicator, projected slot/area, visual outline, representation of the virtual content placement, etc.) can show/identify where the virtual content may be placed within the highlighted surface plane. In some cases, the content placement indicator can depict/identify where and/or how the virtual content would be placed and/or fit within the highlighted surface plane.

In some cases, when the user accepts (e.g., via a user input) a placement of the content placement indicator at an indicated location (e.g., a suggested and/or depicted location) within the highlighted surface plane and/or releases the virtual content item (e.g., during/after a positioning/repositioning of the content placement indicator) at the indicated location, the XR device can snap (e.g., anchor/attach/place) the content placement indicator to the indicated location within the highlighted surface plane. In some examples, the XR device can match (e.g., align, size/resize, fit, position/reposition, conform, etc.) the virtual content to the content placement indicator in the indicated location within the highlighted surface plane. For example, the XR device can position (e.g., set an orientation/rotation and/or location) the virtual content along various dimensions in space (e.g., along X, Y, and/or Z axes in space) according to the position of the content placement indicator at the indicated location. To illustrate, the XR device can place the virtual content in space so as to match the position of the virtual content to the position of the content placement indicator (and/or an associated plane) at the indicated location. In some cases, the XR device can size/scale the virtual content according to a size/scale of the content placement indicator. For example, the XR device can adjust a size/scale of the virtual content according to the size/scale of the content placement indicator so the virtual content item fits in/within the content placement indicator.

In some cases, prior to sizing/scaling, positioning and/or adjusting a position of the virtual content as described above, the XR device can configure (e.g., position, size/scale, shape, etc.) the content placement indicator to fit in/within a space of the highlighted surface plane that is associated with the indicated location and/or to match a configuration (e.g., location, orientation/rotation, perspective, size/scale, shape/geometry, etc.) of the space of the highlighted surface plane. For example, the XR device can configure or reconfigure (e.g., position, size/scale, shape/reshape, etc.) the content placement indicator so it fits in/within (and/or conforms to) the space of the highlighted surface plane associated with the indicated location and/or so as to match a configuration (e.g., location, orientation/rotation, perspective, size/scale, shape/geometry, etc.) of the space of the highlighted surface plane. The XR device can then configure or reconfigure (e.g., position/reposition, size/scale, shape/reshape, etc.) the virtual content according to the configuration (e.g., location, orientation/rotation, perspective, size/scale, shape/geometry, etc.) of the content placement indicator. The XR device can configure or reconfigure the virtual content so it fits in/within (and/or conforms to) the content placement indicator, which can also be anchored to the space of the highlighted surface plane associated with the indicated location and/or configured according to a configuration of the space of the highlighted surface plane that is associated with the indicated location.

In some cases, if a surface associated with a highlighted surface plane is cluttered (e.g., crowded with objects, messy, limited in available space, etc.), the XR device can occlude (e.g., hide/conceal, remove, etc.) at least some of the clutter from the highlight (and/or the highlighted surface plane) for easier positioning and/or viewing of the virtual content in/within the highlighted surface plane. Additionally or alternatively, if a surface associated with a highlighted surface plane is complex (e.g., uneven, rough/coarse/bumpy/textured, elevated, irregular, asymmetrical, curved, three-dimensional, of an uncommon shape, etc.), the XR device can, in some cases, adjust the highlighted surface plane based on a reconfigured (e.g., smoothened/flattened, reshaped, etc.) surface associated with the highlighted surface plane for easier positioning and/or viewing of the virtual content in/within the highlighted surface plane. The XR device can place and render the virtual content in/within the adjusted surface plane. In some cases, if a surface associated with a highlighted surface plane is complex, the XR device can position and/or render the virtual content (and/or the content placement indicator) on a raised surface plane parallel to the (reconfigured) surface, located/placed above the surface (e.g., at a threshold distance/height above the surface), etc., for easier positioning and/or viewing of the virtual content (and/or the content placement indicator) in/within the plane.

In some examples, the XR device can render the content placement indicator within the highlighted surface plane in the same aspect ratio as the virtual content item associated with the content placement indicator. In some cases, the XR device can resize the content placement indicator and the virtual content item associated with the content placement indicator to fit one or more available spaces within a highlighted surface plane. In some examples, as the user moves the virtual content item across the highlighted surface plane, the XR device can move the content placement indicator to available spaces within the highlighted surface plane (and, in some cases, within other highlighted surface planes). In some cases, as the user moves the virtual content item across the highlighted surface plane, the XR device may only move the content placement indicator to available spaces that can fit the content placement indicator (e.g., on which at least a threshold amount of the content placement indicator fits). When moving the content placement indicator, the XR device can skip over cluttered or unavailable areas in the highlighted surface plane, and move the content placement indicator toward the next available space or an adjacent available space in the highlighted surface plane (or another available surface plane). In some examples, the XR device can move the content placement indicator toward a next/adjacent available space in the same direction that the user (and/or the XR device) is moving the virtual content item. In some cases, the user can provide an input to the XR device to release and/or anchor the content placement indicator at an available space within the highlighted surface plane. For example, when the user (e.g., through a user input) releases the virtual content item, the XR device can snap the content placement indicator to a space/region of the surface plane corresponding to the location where the user released the virtual content item. When snapping the content placement indicator to a location, the XR device can match the content placement indicator's configuration (e.g., orientation/rotation, perspective, size/scale, shape, etc.) to the configuration of the space associated with that location.

In some cases, if a surface is too cluttered or uneven (e.g., above a threshold), the XR device can render a highlighted surface plane a distance from (e.g., above, in front, etc.) the higher points on (and/or portions of) that surface. When the user releases the virtual content on that surface, the XR device can place the virtual content at the same level as the highlighted surface plane. If there are items on the surface that are a certain distance from/above (e.g., threshold amount higher than) the average height of the rest of the surface and/or the height of other portions of the surface, the XR device can occlude or ignore those items so the highlighted surface plane is not placed too far above or in front of the rest of the surface.

In some cases, the physical environment may have multiple surfaces on which the content placement indicator and/or the virtual content item can be rendered. The XR device can highlight a specific surface plane as the user or the XR device moves the content placement indicator or the virtual content item. In some cases, to prevent flickering of highlighted surface planes when the user or XR device moves the content placement indicator or the virtual content item between surface planes (and/or when the content placement indicator or the virtual content item overlaps multiple surface planes), the XR device may wait to highlight a surface plane (or may not highlight a surface plane) until a threshold amount of the content placement indicator or the virtual content item is over the surface plane (e.g., from the viewpoint of the user).

In some cases, if the XR device determines that there is no space available for the virtual content item in its aspect ratio or the available space is not optimal for placing the virtual content, the XR device can suggest a different aspect ratio that maximizes the available space. For example, the XR device can adjust an aspect ratio of the content placement indicator or the virtual content item to fit or match an available space. The XR device can render the content placement indicator or the virtual content item on the available space according to the adjusted aspect ratio. For example, if the virtual content is configured according to a wide aspect ratio and an available space does not match or cannot fit the wide aspect ratio, the XR device can render the content placement indicator in the available space according to a narrower aspect ratio. The content placement indicator rendered in the narrower aspect ratio can indicate to the user that the virtual content may be rendered on the available space according to the narrower aspect ratio. If the user releases the virtual content or places the virtual content at the location of the content placement indicator, the XR device can change the virtual content to the narrower aspect ratio and render the virtual content at that location according to the narrower aspect ratio.

In some cases, the XR device can implement the techniques described herein in the context of a virtual reality (VR) session. For example, the XR device can implement the content placement indicator in a video pass through VR application where the XR device captures an image(s) of the physical environment (e.g., including one or more surfaces in the physical environment) and uses the captured image(s) to render the physical environment (e.g., including the one or more surfaces) in a VR display to provide visibility of the physical environment around the user. Here, the XR device can render the content placement indicator within the physical environment rendered/depicted by the XR device using the captured image(s) of the physical environment.

Examples of the systems and techniques described herein for processing data are illustrated in FIG. 1 through FIG. 8 and described below. FIG. 1 is a diagram illustrating an example extended reality (XR) system 100, in accordance with some examples of the disclosure. The XR system 100 can implement the systems and techniques disclosed herein. The XR system 100 can perform various tasks and operations such as, for example, extended reality tasks and operations (e.g., tracking, mapping, localization, content rendering, pose estimation, object detection/recognition, etc.), image/video processing and/or post-processing, data processing and/or post-processing, computer graphics, machine vision, object modeling and registration, multimedia rendering and/or composition, and/or any other data processing tasks, effects, and/or computations.

As used herein, placing a virtual content item on or within a surface or space in a scene of a physical environment means placing or anchoring the virtual content item on or within a location or area in a three-dimensional (3D) map of the scene that corresponds (the location or area) to the surface or space, such that the virtual content item appears to a user of the XR system 100 as if the virtual content item is located on or within the surface or space in the scene. Similarly, as used herein, placing a content placement indicator on or within a surface or space in a scene of the physical environment means placing or anchoring the content placement indicator on or within a location or area in a 3D map of the scene that corresponds (the location or area) to the surface or space, such that the virtual content item appears to a user of the XR system 100 as if the virtual content item is located on or within the surface or space in the scene.

In some examples, the XR system 100 can perform tracking and localization; pose estimation, mapping of the physical world/environment (e.g., a scene) around the XR system 100 (e.g., where the XR system 100 is located); and positioning and rendering of virtual content on a screen, display, and/or visible plane/region as part of an XR experience. For example, the XR system 100 can generate a map (e.g., a three-dimensional (3D) map) of a scene in the physical world, track a pose (e.g., a location and orientation) of the XR system 100 relative to the scene (e.g., relative to the 3D map of the scene), position and/or anchor virtual content in a specific location(s) on the map of the scene (e.g., corresponding to a physical location in the scene, such as a surface, a surface plane, a space within a surface or surface plane, etc.), and render the virtual content item and/or a virtual content placement indicator on a display/screen such that the virtual content item and/or a virtual content placement indicator appears to be at a physical location in the scene corresponding to the specific location on the map of the scene where the virtual content item is positioned and/or anchored.

In the example shown in FIG. 1, the XR system 100 includes one or more image sensors 102, one or more inertial sensors 104 (e.g., one or more inertial measurement units), one or more other sensors 106 (e.g., one or more radio detection and ranging (radar) sensors, light detection and ranging (LIDAR) sensors, acoustic/sound sensors, infrared (IR) sensors, magnetometers, touch sensors, laser rangefinders, light sensors, proximity sensors, motion sensors, active pixel sensors, machine vision sensors, ultrasonic sensors, etc.), storage 108, compute components 110, an XR engine 120, an interface management engine 122 (e.g., a user interface management engine), an image processing engine 124, and a rendering engine 126. It should be noted that the components 102 through 126 shown in FIG. 1 are non-limiting examples provided for illustration and explanation purposes, and other examples can include more, less, and/or different components than those shown in FIG. 1. For example, in some cases, the XR system 100 can include one or more display devices, one more other processing engines, one or more receivers (e.g., global positioning systems, global navigation satellite systems, etc.), one or more communications devices (e.g., radio frequency (RF) interfaces and/or any other wireless/wired communications receivers/ transmitters), one or more other hardware components, and/or one or more other software and/or hardware components that are not shown in FIG. 1. An example architecture and example hardware components that can be implemented by the XR system 100 are further described below with respect to FIG. 8.

Moreover, for simplicity and explanation purposes, the one or more image sensors 102 will be referenced herein as an image sensor(s) 102 (e.g., in singular form). However, as previously noted, the XR system 100 can include a single image sensor or multiple image sensors. Also, references to any of the components of the XR system 100 in the singular or plural form should not be interpreted as limiting the number of such components implemented by the XR system 100 to one or more than one. For example, references to a processor in the singular form should not be interpreted as limiting the number of processors implemented by the XR system 100 to one. One of ordinary skill in the art will recognize that, for any of the components shown in FIG. 1, the XR system 100 can include only one of such component(s) or more than one of such component(s).

The XR system 100 can be part of, or implemented by, a single computing device or multiple computing devices. In some examples, the XR system 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, a laptop or notebook computer, a tablet computer, a set-top box, a smart television, a display device, a gaming console, a video streaming device, an IoT (Internet-of-Things) device, a smart wearable device (e.g., a head-mounted display (HMD), smart glasses, etc.), or any other suitable electronic device(s).

In some implementations, the one or more image sensors 102, the inertial sensor(s) 104, the other sensor(s) 106, storage 108, compute components 110, XR engine 120, interface management engine 122, image processing engine 124, and rendering engine 126 can be part of the same computing device. For example, in some cases, the one or more image sensors 102, the inertial sensor(s) 104, the other sensor(s) 106, storage 108, compute components 110, XR engine 120, interface management engine 122, image processing engine 124, and rendering engine 126 can be integrated into a smartphone, laptop, tablet computer, smart wearable device, gaming system, and/or any other computing device. In other implementations, the one or more image sensors 102, the inertial sensor(s) 104, the other sensor(s) 106, storage 108, compute components 110, XR engine 120, interface management engine 122, image processing engine 124, and rendering engine 126 can be part of two or more separate computing devices. For example, in some cases, some of the components 102 through 126 can be part of, or implemented by, one computing device and the remaining components can be part of, or implemented by, one or more other computing devices.

The image sensor(s) 102 can include any image and/or video sensors or capturing devices, such as a digital camera sensor, a video camera sensor, a smartphone camera sensor, an image/video capture device on an electronic apparatus such as a television or computer, a camera, etc. In some cases, the image sensor(s) 102 can be part of a camera or computing device such as an XR device (e.g., an HMD, smart glasses, etc.), a digital camera, a smartphone, a smart television, a game system, etc. In some examples, the image sensor(s) 102 can be part of a multiple-camera assembly, such as a dual-camera assembly. The image sensor(s) 102 can capture image and/or video content (e.g., raw image and/or video data), which can then be processed by the compute components 110, the XR engine 120, the interface management engine 122, the image processing engine 124, and/or the rendering engine 126 as described herein.

In some examples, the image sensor(s) 102 can capture image data and generate frames based on the image data and/or provide the image data or frames to the XR engine 120, the interface management engine 122, the image processing engine 124 and/or the rendering engine 126 for processing. A frame can include a video frame of a video sequence or a still image. A frame can include a pixel array representing a scene. For example, a frame can be a red-green-blue (RGB) frame having red, green, and blue color components per pixel; a luma, chroma-red, chroma-blue (YCbCr) frame having a luma component and two chroma (color) components (chroma-red and chroma-blue) per pixel; or any other suitable type of color or monochrome picture.

The inertial sensor(s) 104 can detect a specific force and angular rate of the XR system 100. In some cases, the inertial sensor(s) 104 can detect an orientation of the XR system 100. The inertial sensor(s) can generate linear acceleration measurements, rotational rate measurements, and/or heading measurements. In some examples, the inertial sensor(s) 104 can be used to measure the pitch, roll, and yaw of the XR system 100. The other sensor(s) 106 can detect and generate other measurements used by the XR system 100. In some cases, the XR engine 120 can use data and/or measurements from the image sensor(s) 102, the inertial sensor(s) 104, and/or the other sensor(s) 106 to track a pose of the XR system 100. As previously noted, in other examples, the XR system 100 can also include other sensors, such as a magnetometer, an acoustic/sound sensors, an IR sensor, a machine vision sensor, a smart scene sensor, a radar sensor, a LIDAR sensor, a light sensor, etc.

The storage 108 can be any storage device(s) for storing data. Moreover, the storage 108 can store data from any of the components of the XR system 100. For example, the storage 108 can store data from the image sensor(s) 102 (e.g., image or video data), data from the inertial sensor(s) 104 (e.g., measurements), data from the other sensor(s) 106 (e.g., measurements), data from the compute components 110 (e.g., processing parameters, preferences, virtual content, rendering content, scene maps, tracking and localization data, object detection data, configurations, XR application data, recognition data, outputs, etc.), data from the XR engine 120, data from the interface management engine 122, data from the image processing engine 124, and/or data from the rendering engine 126 (e.g., output frames). In some examples, the storage 108 can include a buffer for storing frames for processing by the compute components 110.

The one or more compute components 110 can include a central processing unit (CPU) 112, a graphics processing unit (GPU) 114, a digital signal processor (DSP) 116, and/or an image signal processor (ISP) 118. The compute components 110 can perform various operations such as image enhancement, computer vision, graphics rendering, extended reality (e.g., tracking, localization, pose estimation, mapping, content anchoring, content rendering, etc.), image/video processing, sensor processing, recognition (e.g., text recognition, facial recognition, object recognition, feature recognition, tracking or pattern recognition, scene recognition, occlusion detection, etc.), machine learning, filtering, object detection, and any of the various operations described herein. In the example shown in FIG. 1, the compute components 110 can implement an XR engine 120, an interface management engine 122, an image processing engine 124, and a rendering engine 126. In other examples, the compute components 110 can also implement one or more other processing engines.

The operations for the XR engine 120, the interface management engine 122, the image processing engine 124, and the rendering engine 126 (and any other processing engines) can be implemented by any of the compute components 110. In one illustrative example, the operations of the rendering engine 126 can be executed by the GPU 114, and the operations of the XR engine 120, the interface management engine 122, and the image processing engine 124 can be executed by the CPU 112, the DSP 116, and/or the ISP 118. In some cases, the compute components 110 can include other electronic circuits or hardware, computer software, firmware, or any combination thereof, to perform any of the various operations described herein.

In some examples, the XR engine 120 can perform XR operations based on data from the image sensor(s) 102, the inertial sensor(s) 104, the other sensor(s) 106, and/or one or more sensors on the XR system 100, such as one or more LIDARS, radars, ultrasonic sensors, IR sensors, etc. In some examples, the XR engine 120 can perform tracking, localization, pose estimation, mapping, content anchoring operations and/or any other XR operations/functionalities.

The interface management engine 122 can manage and/or generate interface content presented/rendered by the XR system 100, such as XR interfaces and/or interface objects. For example, the interface management engine 122 can manage and/or generate graphical user interfaces; control objects; visual indicators, such as the content placement indicator described herein, the surface and/or surface plane highlights described herein, etc.; interface elements; etc. In some examples, the interface management engine 122 can perform various operations to determine and/or manage how, where, and/or when to render user interfaces, visual indicators, control objects; etc., during an XR experience. An XR experience can include use of the XR system 100 to present XR content (e.g., virtual reality content, augmented reality content, mixed reality content, etc.) to a user associated with the XR system 100 (e.g., a user wearing the XR system 100 and/or otherwise using the XR system 100 for an XR experience.

In some examples, the XR content and experience can be provided by the XR system 100 through an XR application that provides a specific XR experience such as, for example, an XR gaming experience, an XR classroom experience, an XR shopping experience, an XR entertainment experience, an XR activity (e.g., an operation, a troubleshooting activity, etc.), among other. During the XR experience, the user can view and/or interact with virtual content using the XR system 100. In some cases, the user can view and/or interact with the virtual content while also being able to view and/or interact with the physical environment around the user, allowing the user to have an immersive experience between the physical environment and virtual content mixed or integrated with the physical environment.

In some examples, the interface management engine 122 can use data from the image sensor(s) 102, the inertial sensor(s) 104, the other sensor(s) 106, and/or any other sensors to detect objects (e.g., edges, surfaces, items on surfaces, windows, doors, walls, tables, books, devices, chairs, etc.) in a scene, planes in a scene, etc., identify characteristics of a scene and/or objects in a scene, identify occlusions in a scene, etc. In some examples, the interface management engine 122 can also use data from other devices or applications, such as data from or reported by other user devices and/or data provided by a user of the XR system 100.

In some examples, the interface management engine 122 can coordinate with the XR engine 120 and/or the rendering engine 126 to render user interfaces, control objects, content placement indicators, surface highlights, surface plane highlights, etc. As further described herein, in some examples, the interface management engine 122 can detect surfaces in a scene on which virtual content can be placed for rendering, and the XR system 100 can visually identify such surfaces for the user. For example, the interface management engine 122 can determine a configuration (e.g., size, shape, orientation, perspective, location, gradient, etc.) of a surface in a scene, detect any objects located on the surface, and determine whether there are any available spaces within a surface plane associated with the surface, e.g., aligned with and/or offset from the surface, where a particular virtual content item can be placed for rendering. Available spaces within the surface plane may be determined as such spaces which are not occluded by any of the detected objects. For a surface plane being offset from the surface, part or all of the objects, depending on the value of the offset, can be occluded by the surface plane such that the available (non-occluded) space can be modified by changing the value of the offset.

In some cases, the XR system 100 (e.g., using the XR engine 120, the interface management engine 122, the image processing engine 124, and/or the rendering engine 126) can visually identify the surface plane (e.g., via highlighting, hatching, outlining, changing a visual attribute of the depicted surface to identify the surface as available, etc.) for the user, and the interface management engine 122 can depict a content placement indicator that appears to the user to be located within an available/non-occluded space on the surface plane. The content placement indicator can visually identify to the user the available space as a candidate location for placing and rendering the particular virtual content item. The interface management engine 122 can configure a content placement indicator based on the particular virtual content item. For example, the interface management engine 122 can determine a size and shape of the particular virtual content item, e.g., based on a preceding rendering of the virtual content item and/or a user input, and configure the content placement indicator to have the size and shape of the particular virtual content item. In some cases, the interface management engine 122 can determine a configuration of the content placement indicator and the associated virtual content item that allows them to fit within the available space and/or maintain a certain position, orientation, etc., relative to the available space and/or a surface plane. For example, the interface management engine 122 can change the shape and/or aspect ratio of the content placement indicator and the associated virtual content item if/as needed to fit within the available space.

When the XR system 100 renders the content placement indicator for the user, the content placement indicator can show how the virtual content item would fit and appear if placed within the available space (e.g., if anchored to the available space within the mapped scene and rendered to appear as if the virtual content item is located in/within the available space) where the content placement indicator is depicted to the user. After the content placement indicator is rendered for the user, the user can accept or reject (e.g., via a user input such as an input gesture, an eye gaze interpreted as an input, an input using a controller, or any other input means, e.g., for releasing a dragged virtual content item) the available space as the location for placement of the virtual content. If the user accepts the available space as the location for placement of the virtual content, the XR system 100 can anchor the virtual content item to the available space and render the virtual content item to appear as if located in the available space. If the user rejects the available space, the interface management engine 122 can coordinate with the XR system 100 to render another content placement indicator in a different available space (within the surface plane, or within a different surface plane).

In some examples, if the user attempts to move the content placement indicator to a different location/space, e.g., by moving or dragging the virtual content item across the scene, the interface management engine 122 can coordinate with the XR system 100 to depict the content placement indicator in a different available space. In some cases, the different available space can be an adjacent space. In other cases, if the adjacent space is unavailable (e.g., there are one or more objects and/or occlusions in that space), the interface management engine 122 can coordinate with the XR system 100 to skip the adjacent space (e.g., refrain from placing and depicting the content placement indicator in/within the adjacent space) and depict the content placement indicator in a different, non-adjacent available space.

The image processing engine 124 can perform one or more image processing operations. In some examples, the image processing engine 124 can perform image processing operations based on data from the image sensor(s) 102. In some cases, the image processing engine 124 can perform image processing operations such as, for example, filtering, demosaicing, scaling, color correction, color conversion, segmentation, noise reduction filtering, spatial filtering, artifact correction, etc. The rendering engine 126 can obtain image data generated and/or processed by the compute components 110, the image sensor(s) 102, the XR engine 120, the interface management engine 122, and/or the image processing engine 124, and render content (e.g., virtual content, videos, images, etc.) for presentation on a display device.

While the XR system 100 is shown to include certain components, one of ordinary skill will appreciate that the XR system 100 can include more or fewer components than those shown in FIG. 1. For example, the XR system 100 can also include, in some instances, one or more memory devices (e.g., RAM, ROM, cache, and/or the like), one or more network interfaces (e.g., wired and/or wireless communications interfaces and the like), one or more display devices, and/or other hardware or processing devices that are not shown in FIG. 1. An illustrative example of a computing device and hardware components that can be implemented with the XR system 100 is described below with respect to FIG. 8.

Figure 2A:
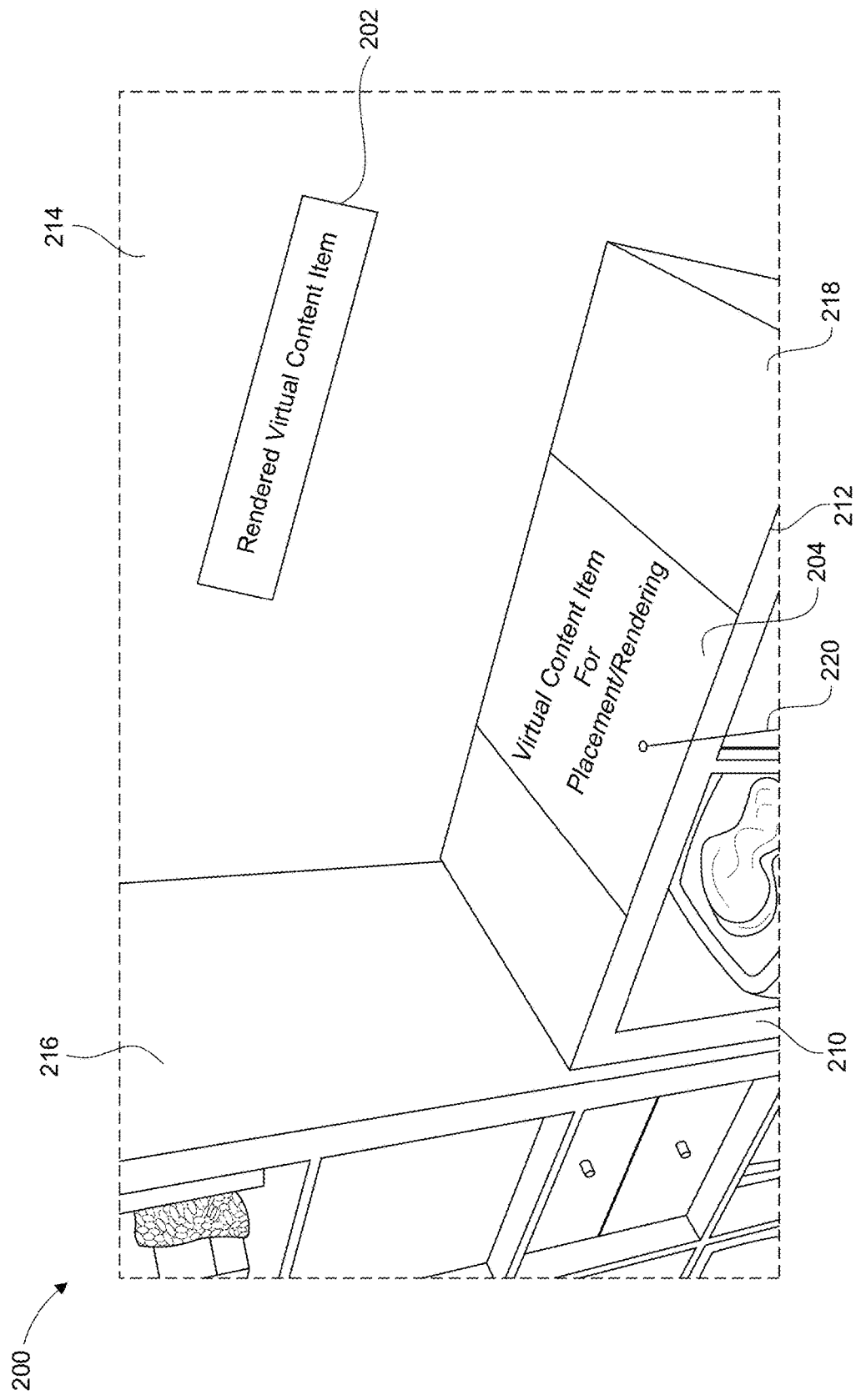
FIG. 2A is a diagram illustrating an example scene with various surfaces available for placing virtual content for rendering, in accordance with some examples of the present disclosure.

FIG. 2A is a diagram illustrating an example scene 200 with various surfaces available for placing virtual content for rendering by the XR system 100. In this example, the scene 200 is a physical environment mixed with a virtual content item 202 that has been rendered by the XR system 100 within the scene. In particular, the virtual content item 202 has been placed on a physical surface 214 (a wall in this example) in the scene 200 and rendered so as to appear to the user as if the virtual content item 202 is actually on the physical surface 214. The scene 200 also includes other surfaces, such as surface 212 which in this example is a top surface of a table 210, and surface 216 which in this example is a side of a bookcase.

Moreover, the user of the XR system 100 has rendered another virtual content item in a first perspective in a first location; namely virtual content item 204 in its original configuration/perspective, somewhere in the foreground on the scene 200 so the virtual content item 204 appears to be actually on the scene 200. To assist the user in identifying a placement for the virtual content item 204 within the scene 200, the XR system 100 can identify surfaces and/or spaces in the scene 200 available for placement of the virtual content item 204. For example, as the user moves the virtual content item 204 through an input element 220, the XR system 100 can identify for the user whether a particular surface and/or space within a surface is available for placement of the virtual content item 204. The input element 220 can include any means for providing inputs to the XR system 100 such as, for example, a hand gesture (e.g., pointing a finger, moving a hand and/or positioning the hand in a certain way, and/or any other hand action or pose) that can be interpreted by the XR system 100 as an input, a head gesture (e.g., a certain motion and/or pose of the user's head interpreted by the XR system 100 as an input, etc.), an eye gaze (e.g., a movement of the eyes and/or an eye gaze towards a location that the XR system 100 can interpret as an input), an input through an input device (e.g., a controller, track pad, mouse, etc.), and/or any other input techniques and/or devices. In this example, the input element 220 includes a ray projected through ray casting.

As shown, the XR system 100 has identified a surface plane 218 as an available surface plane for placing the virtual content item 204. The user can then use the input element 220 to place (e.g., snap, anchor, move, etc.) the virtual content item 204 within the surface plane 218 identified by the XR system 100. The surface plane 218 can include the actual surface 212 of the table 210 or a plane relative to (e.g., parallel to, etc.) the surface 212 of the table 210.

In the example shown in FIG. 2A, the XR system 100 has rendered a content placement indicator on the surface plane 218 by highlighting the surface plane 218 (e.g., rendering a highlighted surface plane) to indicate that the surface plane 218 is available for placement and rendering of the virtual content item 204. In other examples, the XR system 100 may additionally or alternatively indicate the surface plane 218 as available for placement in other ways. For example, in some cases, the XR system 100 can render an outline around the surface plane 218 as a content placement indicator, render the surface plane 218 with a visual pattern (e.g., with a color, gradient, shading, transparency, fill, line, text, shadow, reflection, glow, soft edges, virtual object, etc.) as a content placement indicator, render a visual indicator (e.g., an arrow, text, animation, image, visual effect, etc.) as a content placement indicator, and/or can provide any other rendering or visualization that can indicate the surface plane 218 as available.

Figure 2B:
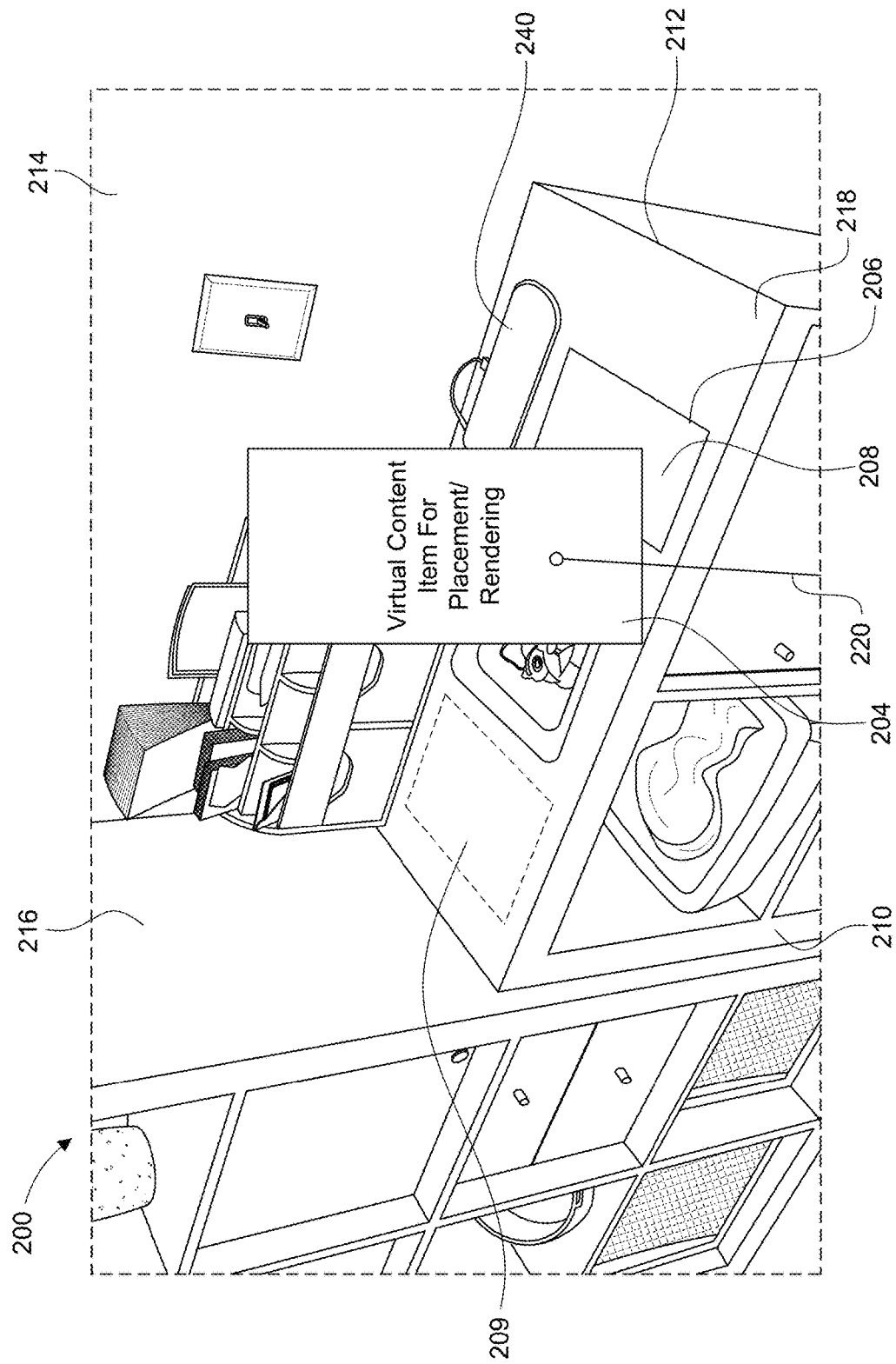
FIG. 2B is a diagram illustrating an example scene with various physical objects on a surface available for placing virtual content for rendering, in accordance with some examples of the present disclosure.

FIG. 2B is a diagram illustrating the example scene 200 from FIG. 2A with various physical objects on the surface 212 of the table 210. In some examples, the XR system 100 can help the user avoid placing the virtual content item 204 on a space in the surface plane 218 that is occupied (occluded) by one or more objects on the surface 212 (or refrain from suggesting such placement) and/or to assist in finding available spaces within the surface plane 218. For example, the XR system 100 can detect any available spaces within the surface plane 218, such as any spaces that are not occupied (occluded) by objects on the surface 212 of the table 210 and/or any spaces that are not cluttered. As will be described further below, the XR system 100 can detect any available spaces within a surface plane that is offset from the associated surface in a direction normal to the surface based on a detection of any spaces that are not occluded by objects. Such objects may be objects on the surface 212 or any other objects in the scene.

In some examples, the XR system 100 can perform surface detection to detect one or more surfaces in the physical environment. The XR system 100 can also perform edge detection to determine any edges of any surfaces and/or objects in the physical environment. The XR system 100 can determine a pose of the XR system 100 in the physical environment. For example, the XR system 100 can determine a pose, orientation, and/or perspective of the XR system 100 based on any detected edges, surfaces, planes, and/or objects in the physical environment. In some examples, the XR system 100 can perform object detection to detect objects in the scene 200. For example, the XR system 100 can perform object detection to detect objects on the surface 212 of the table 210 in the scene 200. The XR system 100 can localize and map any detected objects to track and/or understand the location of the detected objects within the scene 200 (e.g., within a three-dimensional (3D) map of the scene 200 used by the XR system 100 to provide XR functionalities/experiences), including any detected objects within the surface 212. The XR system 100 can then determine any spaces within the surface plane 218 that are available for placing, e.g., by determining portions of the surface plane 218 occluded by objects and segmenting the surface plane into segments, for instance into rectangular spaces, based on the determined occluded portions such that the segments are not occluded by the objects, and rendering the virtual content item 204 (e.g., any spaces within the surface plane 218 that are not occupied/occluded by objects on the surface 212 or elsewhere). For example, the XR system 100 can analyze the 3D map of the scene to identify any spaces/locations within the surface plane 218 that are not associated with mapped objects (e.g., to identify any spaces/locations in the 3D map that correspond to the surface plane 218 and that do not have a mapped object associated with them).

After detecting any spaces within the surface plane 218 that are available for placing and rendering the virtual content item 204, the XR system 100 can render one or more content placement indicators indicating one or more available spaces on the surface plane 218. In some cases, the XR system 100 can render only one content placement indicator at any point in time indicating an available space on the surface plane 218. The location of this single content placement indicator can be determined based on a proximity to (an anchor point/trip of) the input element 220, a proximity to a representation of the virtual content item in a first perspective which may be moved/dragged by means of a user input, an overlap between such a representation and the respective available space, or the like. For example, the XR system 100 can place the content placement indicator 206 on an available space 208 detected by the XR system 100. The content placement indicator 206 can indicate the available space 208 as a candidate location for placing the virtual content item 204. Thus, the content placement indicator 206 indicates to the user that the available space 208 is a location available for placing and rendering the virtual content item 204. In some cases, the content placement indicator 206 indicates to the user which location the virtual content item 204 will automatically be anchored to by the XR system 100 in response to a user input, such as releasing the dragged virtual content item. If the user selects the content placement indicator 206 (e.g., if the user accepts placing the virtual content item 204 on the space 208 of the surface plane 218 identified by the content placement indicator 206), the XR system 100 can place the virtual content item 204 on the space 208 associated with the content placement indicator 206. The XR system 100 can render the virtual content item 204 so as to appear as if the virtual content item 204 is on the space 208 associated with the content placement indicator 206.

In the example shown in FIG. 2B, the XR system 100 has rendered one content placement indicator. However, in some cases, the XR system 100 can render more than one content placement indicator. For example, the XR system 100 can render the content placement indicator 206 and one or more additional content placement indicators associated with one or more additional spaces available for placing and rendering the virtual content item 204. The one or more additional spaces can include one or more spaces on the surface plane 218 highlighted by the XR system 100. In some cases, the one or more additional spaces can include spaces available on different surfaces/surface planes in the scene. For example, the one or more additional spaces can include a space available on surface 214 (which the XR system may or may not highlight for the user), and/or a space available on surface 216 (which the XR system may or may not highlight for the user).

In some cases, when the user moves the virtual content item 204 within the scene 200 (e.g., via input element 220), the XR system 100 can move the content placement indicator 206 to a specific available space on the surface plane 218. Moreover, when moving the content placement indicator 206, the XR system 100 can skip (e.g., refrain from placing/rendering) an object(s) on the surface 212. For example, if the XR system 100 moves the content placement indicator 206 from the available space 209 on the surface plane 218, rather than placing the content placement indicator 206 on the adjacent space on the surface plane 218 that is currently occupied/occluded by the object 230, the XR system 100 can skip over the object 230 and place the content placement indicator 206 on the available space 208 in the surface plane 218. Thus, the XR system 100 can refrain from placing the content placement indicator 206 on the object 230 (or the space occupied by the object 230). In other words, the XR system 100 can switch from rendering the content placement indicator in a first space 209 of the surface plane 218 to rendering the content placement indicator 206 in a second space 208 of the surface plane 218. By switching from one rendering location to the next, the XR system can ensure that the user is always presented with a suggesting for placing the virtual content item. As described above, the suggested space indicated by the currently rendered content placement indicator can be determined based on a proximity to the virtual content item 204 and/or an overlap with the virtual content item 204.

In some examples, the XR system 100 can occlude clutter from the surface plane 218. For example, the XR system 100 can render an occlusion 240 on a cluttered space of the surface 212 to occlude the clutter from the surface plane 218.

Figure 3A:
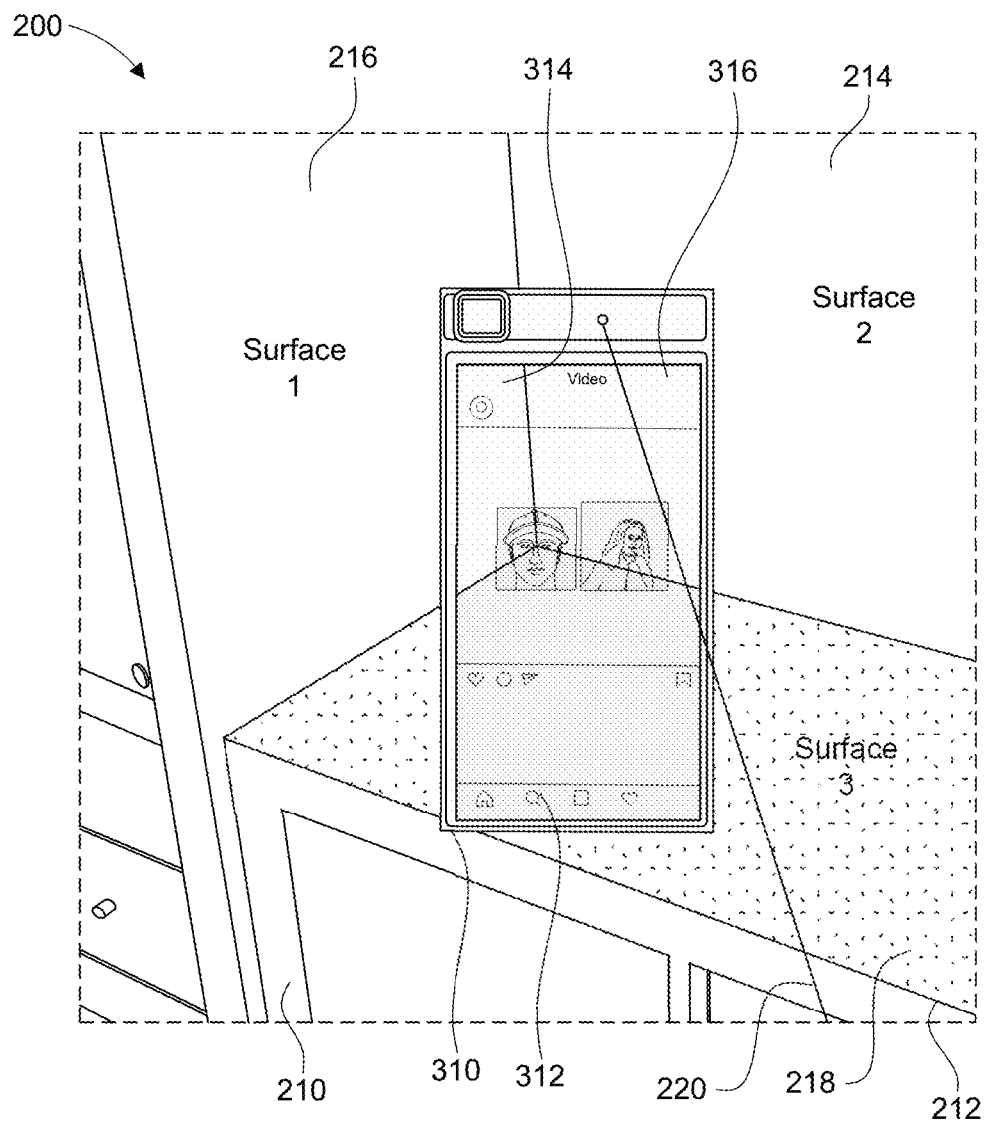
FIG. 3A is a diagram illustrating an example for selecting a surface plane for highlighting when a location of a virtual content item overlaps different surfaces on a scene, in accordance with some examples of the present disclosure.

FIG. 3A is a diagram illustrating an example for selecting a surface plane for highlighting when a location of a virtual content item 310 overlaps different surfaces (or portions thereof) on the scene 200. As described above, highlighting or gradual highlighting of a surface can be used as a respective content placement indicator. As shown in this example, a portion 312 of the virtual content item 310 rendered in a first perspective in a first location, and possibly moved via user input, overlaps with a portion of the surface 212, a portion 314 of the virtual content item 310 overlaps with a portion of the surface 216, and a portion 316 of the virtual content item 310 overlaps with a portion of the surface 214. In some examples, rather than highlight surface planes corresponding to all of the surfaces 212, 214, and 216, the XR system 100 can select a particular surface plane to highlight from the surfaces 212, 214, and 216.

In some cases, the XR system 100 can determine which surface has the largest amount of overlap with the virtual content item 310 and select that surface for highlighting (and/or for rendering a highlighted surface plane). For example, the XR system 100 can determine which of the portions 312, 314, and 316 of the virtual content item 310 that overlap with the surfaces 212, 214, and 216 is largest, and select the surface plane associated with the largest portion of the virtual content item 204. In this example, the portion 312 is larger than the portion 314 and 316. Thus, the XR system 100 can highlight the surface plane 218 corresponding to the surface 212 associated with the portion 312.

In some cases, the XR system 100 can determine if any of the surfaces 212, 214, and 216 contains a threshold amount or percentage of the virtual content item 310. If a threshold amount or percentage of the virtual content item 310 is on/over a surface, the XR system 100 can select that surface for highlighting (and/or for highlighting a surface plane). For example, the XR system 100 can determine if any of the portions 312, 314, and 316 of the virtual content item 310 overlapping with the surfaces 212, 214, and 216 satisfies or exceeds a threshold. The threshold can be chosen, e.g. at 50% or more, such that only a single surface plane is highlighted at a time. The XR system 100 can select the surface associated with the portion of the virtual content item 310 (e.g., the portion from the portions 312, 314, and 316) that satisfies or exceeds the threshold.

Figure 3B:
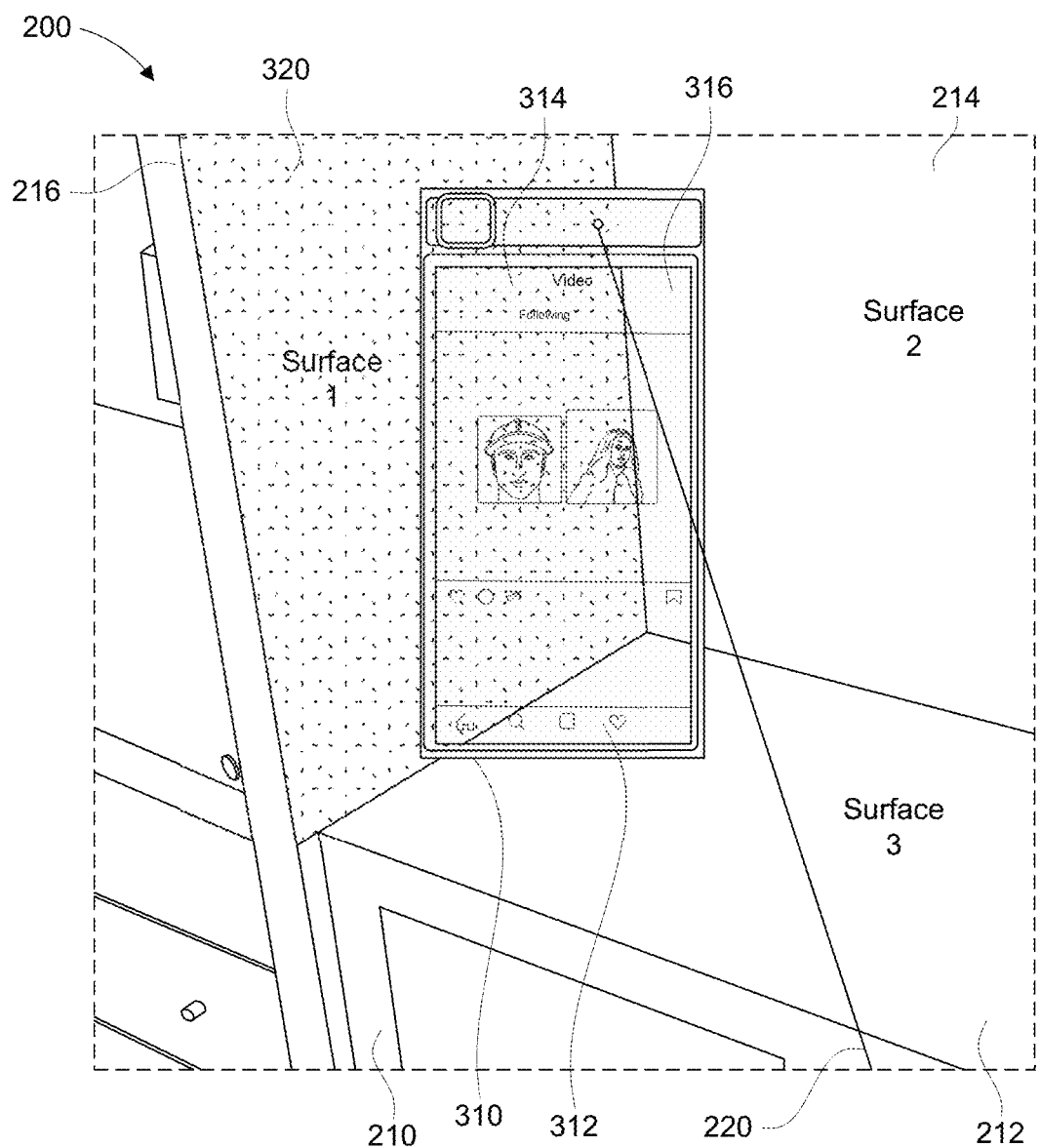
FIG. 3B is a diagram illustrating an example for switching between surface planes highlighted for placement of a virtual content item, in accordance with some examples of the present disclosure.

In some examples, the XR system 100 can switch highlighted surface planes, e.g., as rendered content placement indicators, when the user moves the virtual content item 310 (e.g., via input element 220). For example, as shown in FIG. 3B, the user has moved the virtual content item 310 such that the portion 314 of the virtual content item 310 that overlaps with the surface 216 exceeds the threshold and/or is larger than the portion 312 of the virtual content item 310 overlapping with the surface 212 and the portion 316 of the virtual content item 310 overlapping with the surface 214. The XR system 100 can determine that the portion 314 of the virtual content item 310 that overlaps with the surface 216 exceeds the threshold and/or is larger than the portion 312 of the virtual content item 310 overlapping with the surface 212 and the portion 314 of the virtual content item 310 overlapping with the surface 214, and highlight the surface plane 320 corresponding to the surface 216 associated with the portion 314 of the virtual content item 310 that exceeds the threshold and/or is larger than the portions 312 and 314 of the virtual content item 310. Thus, the XR system 100 can switch from rendering a content placement indicator by highlighting the surface plane 218 associated with the surface 212 as shown in FIG. 3A, to rendering a content placement indicator by highlighting the surface plane 320 associated with the surface 216 as shown in FIG. 3B.

In some cases, to prevent flickering between surface plane highlights, the XR system 100 can set a particular threshold for determining which surface to select as previously described. In some examples, the XR system 100 can set the threshold to at least 60% to prevent flickering between surface plane highlights. For example, the XR system 100 can select a surface/surface plane when at least 60% of the virtual content item 310 overlaps with that surface. To illustrate, if the portion 314 of the virtual content item 310 includes at least 60% of the virtual content item 310, the XR system 100 can select the surface plane 320 corresponding to the surface 216 that overlaps with the portion 314 of the virtual content item 310.

In some cases, the XR system 100 can similarly switch between available spaces on a highlighted surface plane. For example, when the XR system 100 moves a content placement indicator (e.g., content placement indicator 206) within a highlighted surface plane, if the content placement indicator overlaps with several available spaces on the highlighted surface plane, the XR system 100 can select the available space having the largest amount of overlap with the content placement indicator and place/render the content placement indicator in that available space. As another example, when the XR system 100 moves a content placement indicator (e.g., content placement indicator 206) within a highlighted surface plane, if the content placement indicator overlaps with several available spaces on the highlighted surface plane, the XR system 100 can select the available space having an overlap with the content placement indicator that meets or exceeds a certain threshold, and place/render the content placement indicator in that available space. The described moving/switching of the content placement indicator between available spaces can be performed without highlighting the surface plane. The content placement indicator can further be in the form of a brightness/color grading of the highlight of the surface plane to indicate the respective available space.

In some cases, if the XR system 100 determines that there is no space available in a surface plane for the virtual content item in its aspect ratio or an available space is not optimal for placing the virtual content, the XR system 100 can suggest a different aspect ratio for the virtual content item that maximizes the space available and/or fits within an available space. The suggestion can be in the form of changing the content placement indicator from a first to a second aspect ratio upon switching between the available spaces. For example, the XR system 100 can adjust an aspect ratio of the content placement indicator and/or the virtual content item to fit or match an available space. The XR system 100 can render the resized content placement indicator and/or the resized virtual content item on the available space according to the adjusted aspect ratio.

FIG. 4 is a diagram illustrating an example adjustment of an aspect ratio of a content placement indicator 404 to fit within an available space on the surface plane 218. In this example, the surface 212 of the desk 210 in the scene 200 is covered by objects. The XR system 100 has identified the space 420 between the objects 410, 412, 414, 416, and 418 as an available space, e.g., via object detection, occlusion detection, and segmentation. However, the virtual content item 402 does not fit the space 420 in the current aspect ratio of the virtual content item 402 (as rendered in the first perspective). Accordingly, the XR system 100 can render the content placement indicator 404 in the space 420 according to an aspect ratio that is narrower than the aspect ratio of the virtual content item 402.

For example, the XR system 100 can adjust the aspect ratio of the content placement indicator 404 from a wide aspect ratio corresponding to the aspect ratio of the virtual content item 402 to a narrower aspect ratio that allows the content placement indicator 404 to fit within the space 420. The XR system 100 can place the content placement indicator 404 within the space 420 according to the narrower aspect ratio, and render the content placement indicator 404 so as to appear located in the narrower aspect ratio and within the space 420. When the user releases the virtual content item 402 and/or snaps (e.g., places/anchors) the virtual content item 402 to the content placement indicator 404 (and/or the space 420 associated with the content placement indicator 404), the XR system 100 can change the aspect ratio of the virtual content item 402 to match that of the content placement indicator 404, and place the virtual content item 402 in the space 420 according to the adjusted aspect ratio. The XR system 100 can render the virtual content item 402 in the adjusted aspect ratio so as to appear to be located on the space 420. Adjustment of size and/or aspect ratio of the content placement indicator 404 can be conditioned on a minimum height and/or width of the virtual content item after placing/rendering in the current view of the user. In other words, spaces on the surface plane 218 can be determined as not available/not suitable for rendering the virtual content item based on their size (height and/or width) in the current view being smaller than a minimum (height and/or width) threshold. Such spaces will not explicitly be indicated by the XR system 100 by rendering a dedicated content placement indicator (such as a gradient highlight and/or visual outline) on the respective spaces.

In some examples, the capability for adjusting the aspect ratio for placing the virtual content item 402 can be enabled by a user setting or enabled by default. In some cases, the adjusted aspect ratio and/or the configuration/parameters of the adjusted virtual content item 402 (and/or the adjusted content placement indicator) can be defined by a user setting or can be dictated by the virtual content item 402. For example, in some cases, the adjusted aspect ratio of the virtual content item 402 (and/or whether the aspect ratio of the virtual content item 402 can be adjusted) can depend on the type of virtual content of the virtual content item 402 and/or whether the virtual content item 402 is suitable or capable of resizing. For example, a virtual content item including text content can represent a type of virtual content not suitable for adjustment of the aspect ratio.

In some cases, if a surface does not have available spaces, e.g., non-occluded spaces having at least a minimum size, (and/or has a threshold amount of clutter) or if a surface is a complex surface (e.g., uneven, rough/coarse/bumpy/textured, elevated, irregular, asymmetrical, curved, three-dimensional, of an uncommon shape, etc.), the XR system 100 can determine a surface plane associated with the surface which is generally aligned with the surface in terms of reflecting the overall perspective (orientation) of the complex surface. The surface plane can be seen as a simplification of the complex surface, e.g., by smoothening/flattening, reshaping, etc. the surface, performing edge detection on the complex surface to determine a perspective of the complex surface, detecting and removing objects on the surface, etc. The surface plane can be determined as a planar representation of the complex surface for easier positioning and/or viewing of the virtual content item in/within the highlighted surface plane. The surface plane can be located at an average surface level of the complex surface or be offset by an offset value in a direction normal to the surface plane/simplified complex surface. The offset can be toward a viewpoint of the user. As a result, the adjusted (offset) surface plane will occlude at least part of the complex surface and therefore, make (more) spaces available for rendering the virtual content item. The XR system 100 can place and render the virtual content item in/within the adjusted surface plane. In some cases, if the surface is complex, the XR system 100 can position and/or raise/elevate/offset the highlighted surface plane and the content placement indicator and render them on a raised/elevated plane relative to (e.g., generally parallel to) the complex surface. The highlighted surface plane/content placement indicator can be located/placed above the surface (e.g., at a threshold distance/height above the surface), etc., for easier positioning and/or viewing of the virtual content item (and/or the content placement indicator) in/within the surface plane.

FIG. 5A is a diagram illustrating an example surface plane 512 and content placement indicator 504 that are rendered at a certain position relative to a surface 510 that is complex. As shown, the surface 510 is uneven because the surface 510 is created by books on a bookcase that are of different sizes. Thus, the surface 510 is not flat/even and does not have an available space that is flat or even. In some cases, the perspective or orientation of the surface plane 512 can be determined based on edge detection (of the books on the shelf) and identifying parallel edges and their common orientation. The XR system 100 can move the surface plane 512 and content placement indicator 504 rendered to be a certain distance (offset) from the surface 510 toward the viewpoint of the user. For example, the XR system 100 can move the surface plane 512 and content placement indicator 504 to be a threshold distance away from (e.g., above, in front, etc.) the surface 510 (e.g., from the viewpoint of the user of the XR system 100). The XR system 100 can render the surface plane 512 and content placement indicator 504 at the moved position, which is a threshold distance from the surface 510.

Figure 5B:
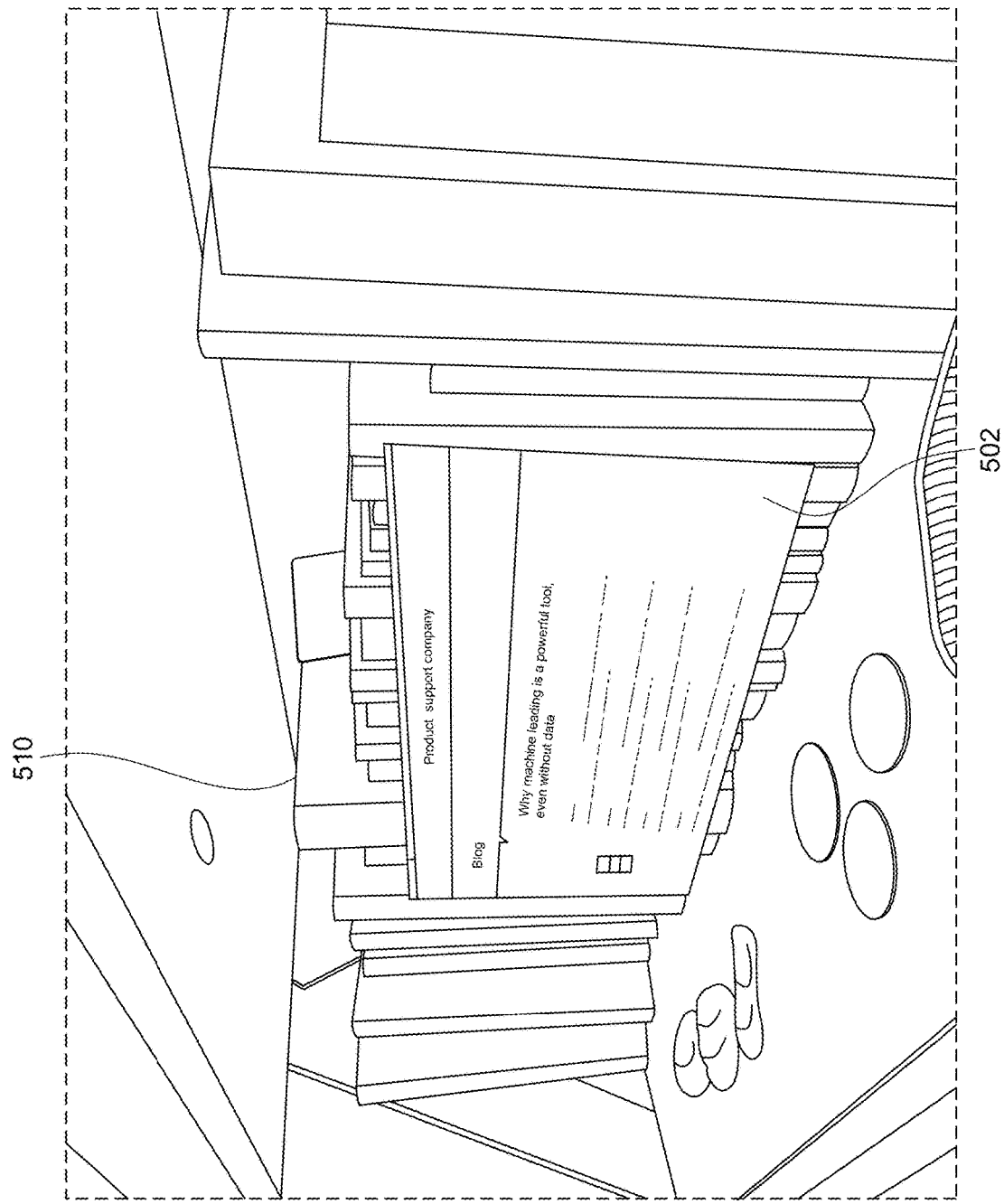
FIG. 5B is a diagram illustrating an example rendering of virtual content at a certain position relative to a surface that is complex, in accordance with some examples of the present disclosure.

With reference to FIG. 5B, when the user releases the virtual content item 502 on the content placement indicator 504 and/or accepts the placement of the virtual content item 502 within the content placement indicator 504, the XR system 100 can place the virtual content item 502 in the content placement indicator 504 and render the virtual content item 502 at the position associated with the content placement indicator 504 at the time of releasing the virtual content item 502, which is a threshold distance away from the surface 510 as previously explained. As previously explained, the content placement indicator 504 may be moved across the surface plane 512 based on a movement of the virtual content item 502 in response to user input.

Figure 5C:
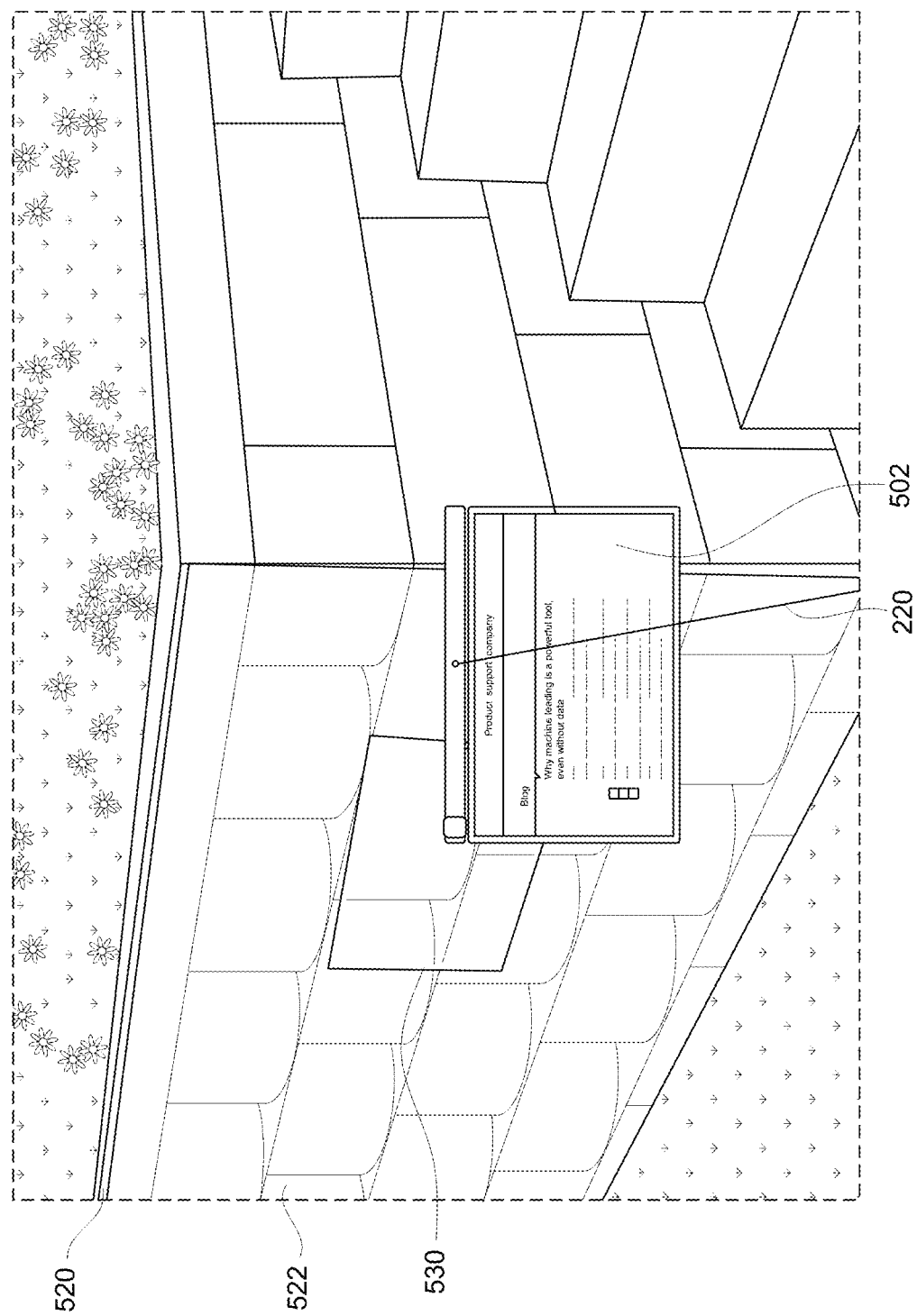
FIG. 5C is a diagram illustrating another example surface plane and content placement indicator that are rendered at a certain position relative to a surface that is complex, in accordance with some examples of the present disclosure.

FIG. 5C is a diagram illustrating another example surface plane 522 and content placement indicator 530 that are rendered at a certain position relative to (offset from) a surface 520 that is complex. The surface 520 in this example is a wall made up of irregularly-shaped (e.g., curved) cement blocks that create an irregular/uneven surface. Thus, the surface 520 is not flat but rather irregular/uneven. As shown, since the surface 520 is irregular/uneven, the XR system 100 can determine a perspective (orientation) of the surface plane 522 based on a simplified (smoothened, flattened, reshaped, etc.) surface. Additionally or alternatively, edge detection can be performed to determine the perspective (orientation) of the surface plane 522. The XR system can move/offset the surface plane 522 and content placement indicator 530 rendered to be/appear a certain distance/offset in front of the surface 520, i.e., toward a viewpoint of the user. For example, the XR system 100 can move the surface plane 522 and content placement indicator 530 to be a threshold distance in front of the surface 520 (e.g., from the viewpoint of the user of the XR system 100). The XR system 100 can render the surface plane 522 and content placement indicator 530 at the moved/offset position that is a threshold distance in front the surface 520.

Figure 5D:
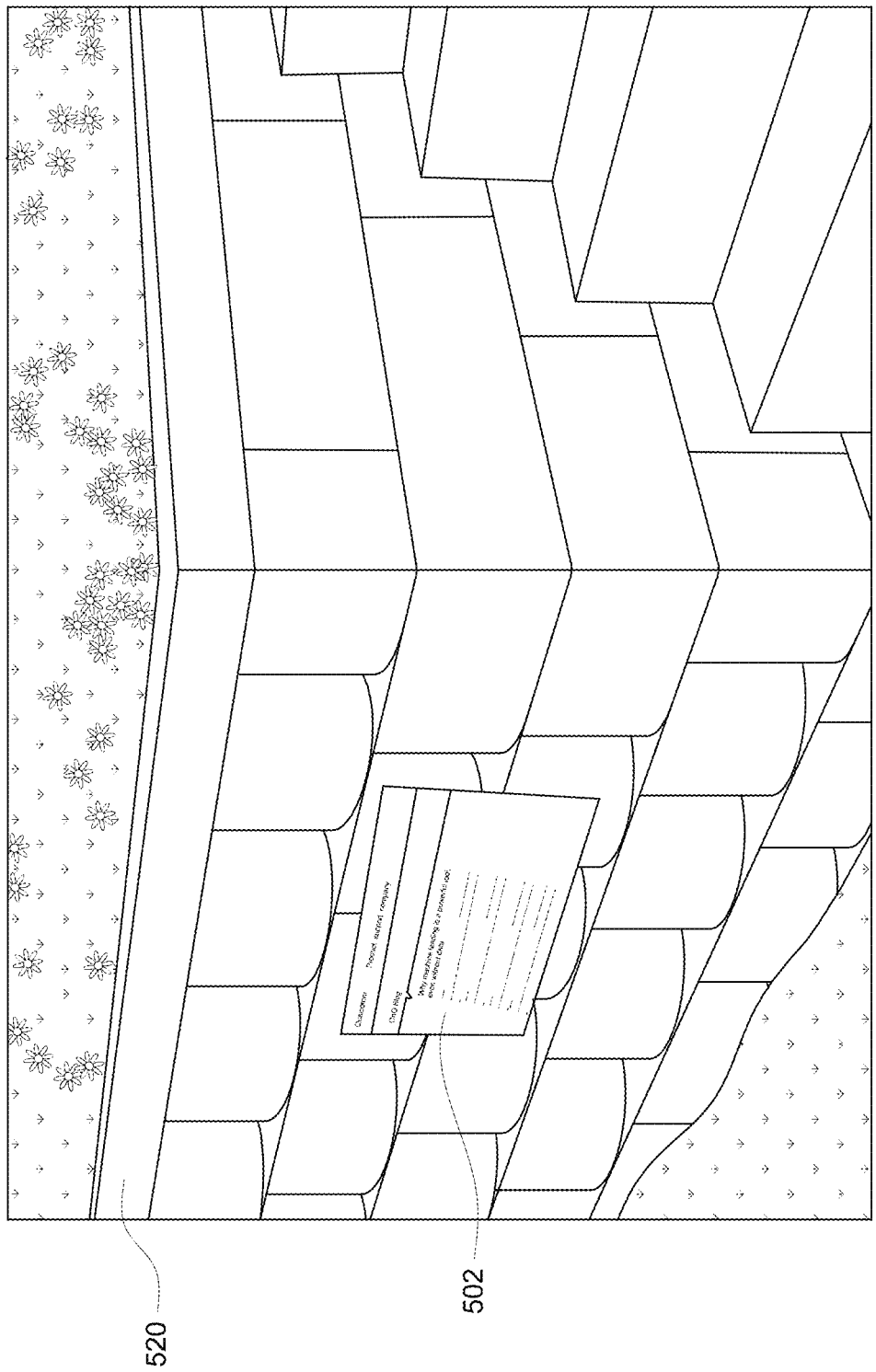
FIG. 5D is a diagram illustrating another example rendering of virtual content at a certain position relative to a surface that is complex, in accordance with some examples of the present disclosure.

With reference to FIG. 5D, when the user releases the virtual content item 502 on the content placement indicator 530 and/or accepts the placement of the virtual content item 502 within the content placement indicator 530, the XR system 100 can place the virtual content item 502 in the content placement indicator 530 and render the virtual content item 502 at the position associated with the content placement indicator 530 at the time of releasing the virtual content item, which is a threshold distance in front of the surface 520 as previously explained.

Figure 6:
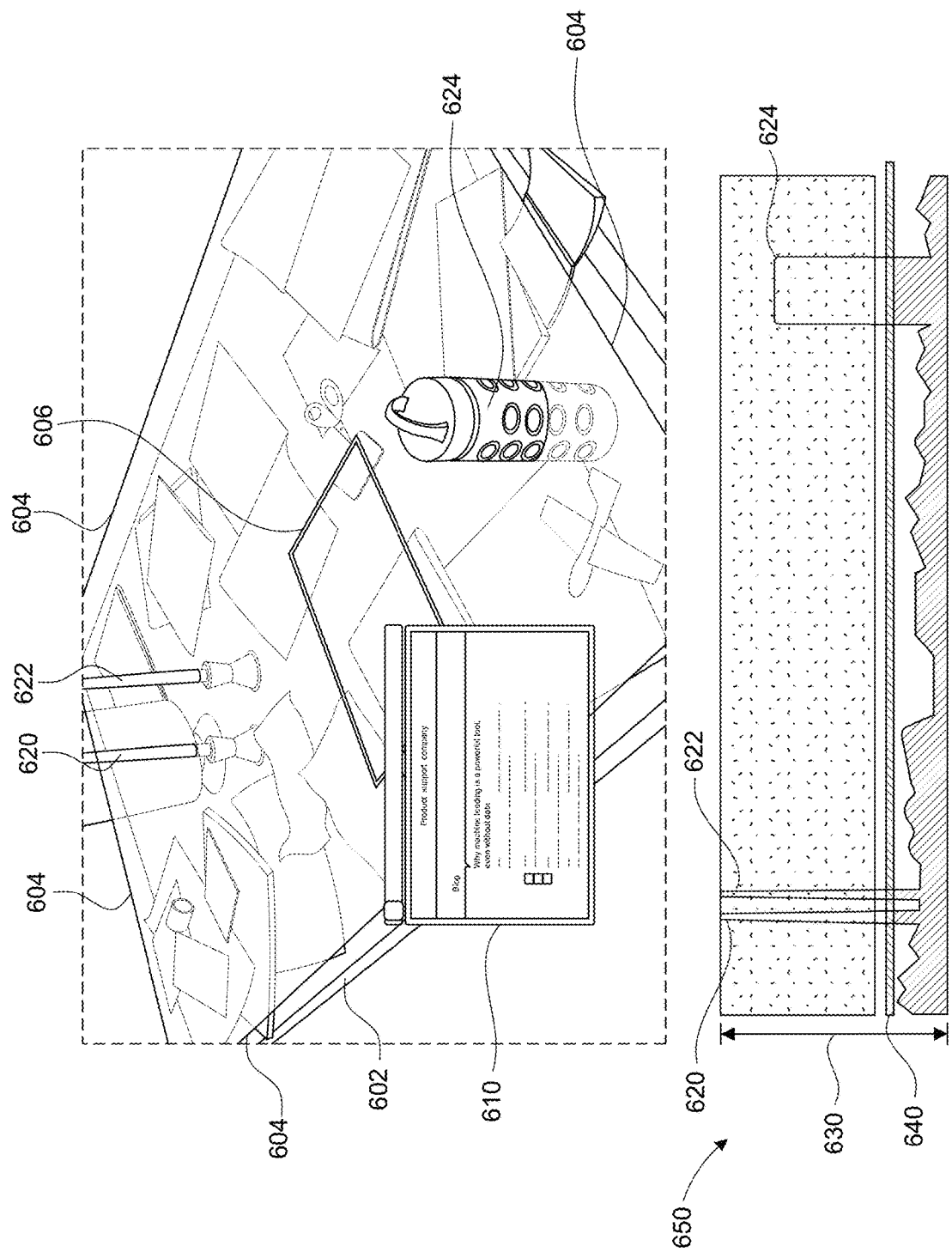
FIG. 6 is a diagram illustrating an example rendering of a highlighted surface plane and a content placement indicator in a scene that has a surface with no available spaces, in accordance with some examples of the present disclosure.

FIG. 6 is a diagram illustrating an example rendering of a highlighted surface plane and a content placement indicator in a scene that has a surface with no available spaces (fulfilling the minimum size requirement). In this example, the surface 602 of a table is cluttered with items and does not have a space available (e.g., that is not occupied/occluded by any items) for placing the virtual content item 610. Since the surface 602 does not have available space, the XR system 100 can elevate/raise the highlighted surface plane 604 a certain distance/height above the surface 602, as well as the content placement indicator 606 rendered on the highlighted surface plane 604. As in the previous examples, the table top cluttered with items can be considered a complex surface which may be simplified as described above to determine an associated surface plane. The surface plane 604 can be offset from an average surface level of the complex surface by a specific offset value as described in the following.

In some examples, if there are one or more objects that extend beyond the surface 602 a threshold distance/amount more than other items on the surface 602, the XR system 100 may place the highlighted surface plane 604 at certain distance/offset away from the surface 602 that allows the highlighted surface plane 604 to partially occlude the one or more objects. In other words, the distance from the surface 602 may not be sufficient to completely occlude those one or more objects that extend beyond the surface 602 a threshold distance/amount more than other items on the surface 602.

For example, in FIG. 6, the candles 620 and 622 and the water bottle 624 on the surface 602 are significantly taller than the rest of the items on the surface 602. Consequently, the candles 620 and 622 and the water bottle 624 extend a significant amount above the rest of the items relative to the surface 602. Given the height of the candles 620 and 622 and the water bottle 624, if the highlighted surface plane 604 is raised/elevated above the candles 620 and 622 and the water bottle 624, the raised/elevated position of the highlighted surface plane 604 may cause the highlighted surface plane 604 to appear too far above the surface 602. In other words, at such height, the highlighted surface plane 604 may not appear to the user to be on the surface 602 or close to the surface 602, but may rather appear to be floating in the air.

To prevent this, the XR system 100 can implement a rule to define thresholds and/or ranges for moving (e.g., elevating/raising/offsetting) the highlighted surface plane 604 relative to the surface 602 and/or the other items on the surface 602. If the farthest point of an object(s) (e.g., the candles 620 and 622 and the water bottle 624) relative to the surface 602 (and/or the top or average height of the rest of the items on the surface 602) exceeds a defined threshold and/or range, the XR system 100 can place/render the highlighted surface plane 604 at a distance from the surface 602 and/or the rest of the items on the surface 602 that is within the threshold and/or range, even if a portion of the object(s) (e.g., the candles 620 and 622 and the water bottle 624) will be occluded by the highlighted surface plane 604 while another portion of the object(s) extends beyond the highlighted surface plane 604 (e.g., even if the highlighted surface plane 604 only partially occludes the object(s)).

For example, in FIG. 6, the farthest points of the candles 620 and 622 and the water bottle 624 relative to the surface 602 (and/or the top or average height of the other items on the surface 602) exceed a threshold height 640 above the surface 602. Accordingly, the highlighted surface plane 604 is placed and rendered within the threshold height 640 above the surface 602. Thus, the highlighted surface plane 604 partially occludes the candles 620 and 622 and the water bottle 624 but is not elevated/raised to or beyond the surface height 630, which includes the farthest points of the candles 620 and 622 and the water bottle 624 relative to the surface 602 and/or the other items on the surface 602. This way, the highlighted surface plane 604 is not moved too far away from the surface 602 and/or the other items on the surface 602.

Alternatively, the surface plane 604 can be moved by increasing an offset until at least one space on the moved/offset surface plane becomes available for rendering the virtual content item 610. To this end, an initial location of the surface plane can be determined, e.g., at an average height above the surface 602. As previously described, parts of the initial surface plane occluded by objects such as the candles 620 and 622 and the water bottle 624 can be determined and available space(s) (fulfilling the minimum size requirement) can be determined based on the non-occluded parts of the initial surface plane. As the initial surface plane is offset/raised relative to the surface 602, the initial surface plane if highlighted partially occludes the candles 620 and 622 and the water bottle 624 as well as most, if not all of the other items on the surface 602. If it is determined that the initial surface plane does not have any available space (fulfilling the minimum size requirement), the offset of the surface plane can be (repeatedly) increased, e.g., by a predefined amount, and the above described process repeated until at least one space (fulfilling the minimum size requirement) becomes available for rendering the virtual content item. In this way, even complex surfaces can be processed to determine a surface plane suitable for rendering the virtual content item.

Figure 7:
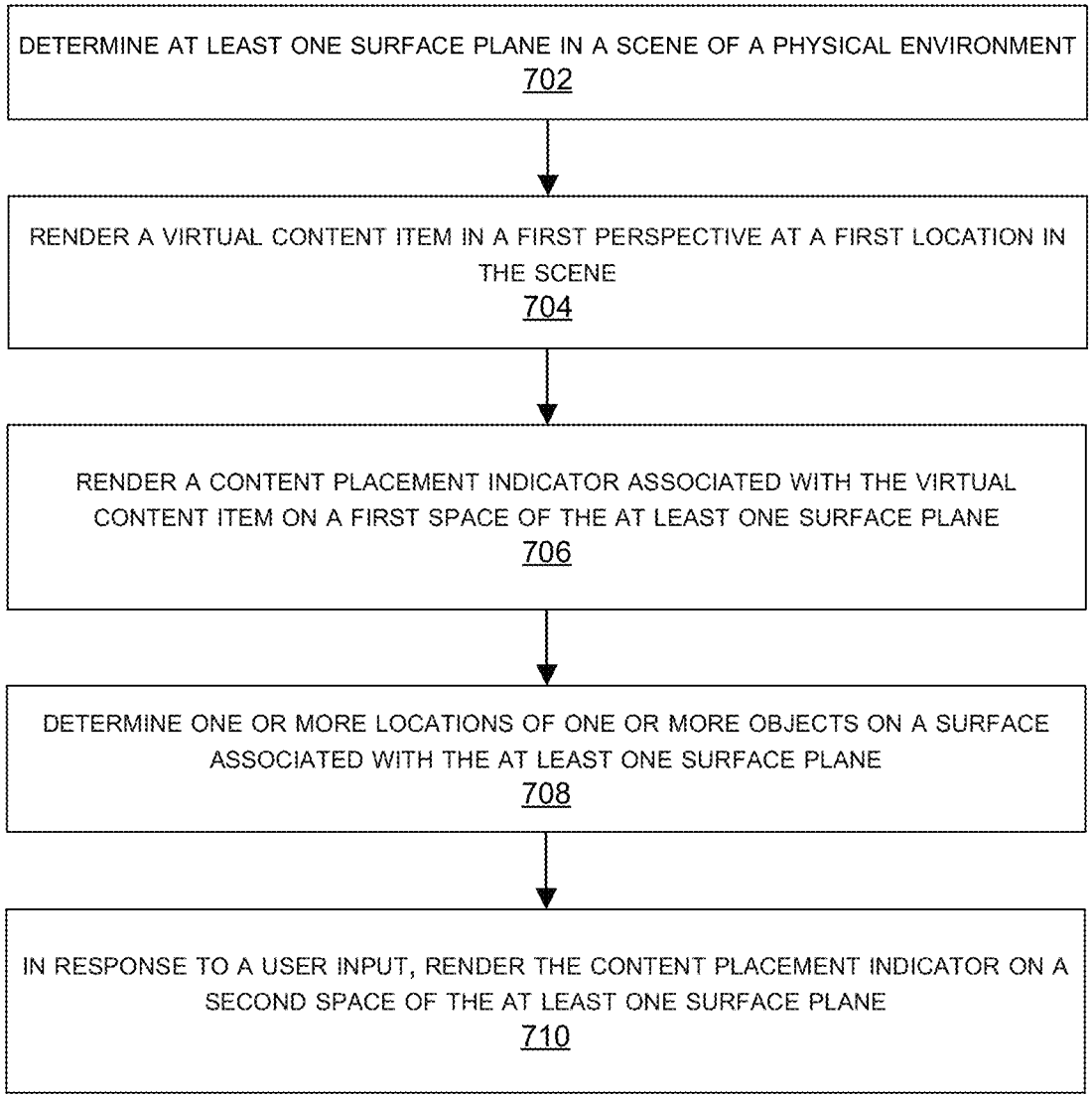
FIG. 7 is a flowchart illustrating an example process for anchoring virtual content to physical surfaces, in accordance with some examples of the present disclosure.

FIG. 7 is a flowchart illustrating an example process 700 for placing a virtual content item on a surface of a physical scene. At block 702, the process 700 can include determining at least one surface plane in a scene of a physical environment. In some cases, determining the at least one surface plane in the scene can include determining one or more surfaces of the one or more objects in the scene, and determining the at least one surface plane based on the one or more surfaces of the one or more objects in the scene.

At block 704, the process 700 can include rendering a virtual content item in a first perspective at a first location in the scene.

At block 706, the process 700 can include rendering a content placement indicator associated with the virtual content item on a first space of the at least one surface plane. In some examples, the content placement indicator can indicate at least part of the first space for placement of the virtual content item.

At block 708, the process 700 can include determining one or more locations of one or more objects on a surface associated with the at least one surface plane.

At block 710, the process 700 can include, in response to a user input, rendering the content placement indicator on a second space of the at least one surface plane. In some examples, the second space of the at least one surface plane is determined based on the one or more locations and the user input. In some examples, the content placement indicator can indicate at least part of the second space for placement of the virtual content item.

In some aspects, the process 700 can include, in response to an additional user input requesting placement of the virtual content item on the second space, rendering the virtual content item in a second perspective at a second location in the scene based on the content placement indicator. In some examples, the second location can be within the second space. In some cases, the process 700 can include determining the second perspective based on a perspective of the second space.

In some aspects, the process 700 can include determining a first surface plane and a second surface plane of the at least one surface plane, the first space being associated with the first surface plane and the second space being associated with the second surface plane; and determining the second perspective based on a perspective of the second surface plane.

In some examples, rendering the content placement indicator on the second space can include determining an overlap of the virtual content item with the second surface plane, and upon determination that the overlap exceeds a first threshold, switching to rendering the content placement indicator on the second space associated with the second surface plane.

In some examples, the first space and the second space are associated with a first surface plane of the at least one surface plane. In some aspects, the process 700 can include detecting one or more objects, wherein the one or more objects occlude at least part of the first surface plane; and segmenting the first surface plane into at least a first segment and a second segment based at least on an occluded part of the first surface plane. In some examples, the first space is associated with the first segment and the second space is associated with the second segment.

In some cases, segmenting the first surface plane into at least the first segment and the second segment can include determining a fit of the virtual content item rendered in a perspective of the first surface plane in the first segment and the second segment.

In some aspects, the process 700 can include changing an aspect ratio of the virtual content item between the first segment and the second segment.

In some aspects, the process 700 can include prior to rendering the content placement indicator on the second space, rendering the virtual content item in a third perspective at a third location in the scene based on the content placement indicator. In some examples, the third location can be within the first space.

In some aspects, the process 700 can include, in response to the user input, moving the content placement indicator within the first space prior to rendering the content placement indicator on the second space.

In some cases, determining the at least one surface plane in the scene can include applying an offset to the at least one surface plane normally to at least one surface and toward a view point of a user associated with the computing device.

In some cases, determining the at least one surface plane in the scene can include determining one or more edges of the one or more objects in the scene, and determining the at least one surface plane based on the one or more edges of the one or more objects in the scene.

In some cases, rendering the content placement indicator can include rendering a pattern on the at least one surface plane. In some examples, the pattern can include at least one of a highlight, an outline, a color, a shade, a shadow, a hatching, and a gradient.

In some examples, the processes described herein (e.g., process 700, and/or any other process described herein) may be performed by a computing device or apparatus. In one example, the process 700 can be performed by the XR system 100 of FIG. 1. In another example, the process 700 can be performed by the computing system having the computing device architecture 800 shown in FIG. 8. For instance, a computing device with the computing device architecture 800 shown in FIG. 8 can implement the operations of FIG. 7 and/or the components and/or operations described herein with respect to any of FIGS. 1 through 7.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a laptop computer, a smart television, a camera, and/or any other computing device with the resource capabilities to perform the processes described herein, including the process 700 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 700 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 8:
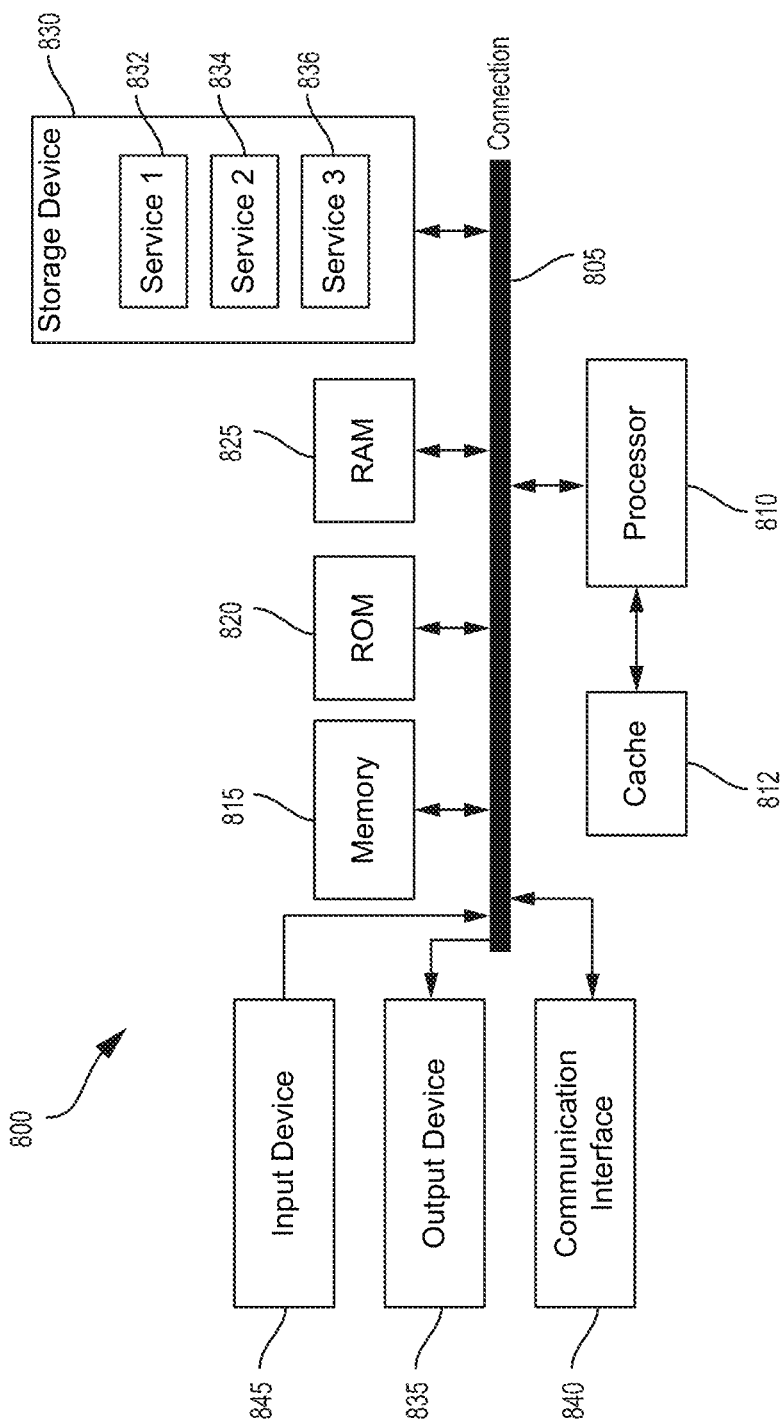
FIG. 8 is a diagram illustrating an example system architecture for implementing certain aspects described herein.

FIG. 8 is a diagram illustrating an example of a system for implementing certain aspects of the present technology. In particular, FIG. 8 illustrates an example of computing system 800, which can be for example any computing device making up internal computing system, a remote computing system, a camera, or any component thereof in which the components of the system are in communication with each other using connection 805. Connection 805 can be a physical connection using a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read-only memory (ROM) 820 and random access memory (RAM) 825 to processor 810. Computing system 800 can include a cache 812 of high-speed memory connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms. In some instances, multimodal systems can enable a user to provide multiple types of input/output to communicate with computing system 800. Computing system 800 can include communications interface 840, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections.

Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Aspect 1. An apparatus for rendering virtual content in a scene of a physical environment, the apparatus comprising: memory; and one or more processors coupled to the memory, the one or more processors being configured to: determine at least one surface plane in the scene of the physical environment; render a virtual content item in a first perspective at a first location in the scene; render a content placement indicator associated with the virtual content item on a first space of the at least one surface plane, the content placement indicator indicating at least part of the first space for placement of the virtual content item; determine one or more locations of one or more objects on a surface associated with the at least one surface plane; and in response to a user input, render the content placement indicator on a second space of the at least one surface plane, wherein the second space of the at least one surface plane is determined based on the one or more locations and the user input, the content placement indicator indicating at least part of the second space for placement of the virtual content item.

Aspect 2. The apparatus of Aspect 1, wherein the one or more processors are further configured to: in response to an additional user input requesting placement of the virtual content item on the second space, render the virtual content item in a second perspective at a second location in the scene based on the content placement indicator, the second location being within the second space.

Aspect 3. The apparatus of Aspect 2, wherein the one or more processors are further configured to: determine the second perspective based on a perspective of the second space.

Aspect 4. The apparatus of Aspect 2, wherein the one or more processors are further configured to: determine a first surface plane and a second surface plane of the at least one surface plane, the first space being associated with the first surface plane and the second space being associated with the second surface plane; and determine the second perspective based on a perspective of the second surface plane.

Aspect 5. The apparatus of Aspect 4, wherein, to render the content placement indicator on the second space, the one or more processors are configured to: determine an overlap of the virtual content item with the second surface plane; and upon determination that the overlap exceeds a first threshold, switch to rendering the content placement indicator on the second space associated with the second surface plane.

Aspect 6. The apparatus of any of Aspects 1 to 5, wherein the first space and the second space are associated with a first surface plane of the at least one surface plane; and wherein the one or more processors are further configured to: detect one or more objects, wherein the one or more objects occlude at least part of the first surface plane; and segment the first surface plane into at least a first segment and a second segment based at least on an occluded part of the first surface plane; wherein the first space is associated with the first segment and the second space is associated with the second segment.

Aspect 7. The apparatus of Aspect 6, wherein to segment the first surface plane into at least the first segment and the second segment, the one or more processors are configured to determine a fit of the virtual content item rendered in a perspective of the first surface plane in the first segment and the second segment.

Aspect 8. The apparatus of any of Aspects 6 to 7, wherein the one or more processors are further configured to change an aspect ratio of the virtual content item between the first segment and the second segment.

Aspect 9. The apparatus of any of Aspects 1 to 8, wherein the one or more processors are configured to: prior to rendering the content placement indicator on the second space, render the virtual content item in a third perspective at a third location in the scene based on the content placement indicator, the third location being within the first space.

Aspect 10. The apparatus of any of Aspects 1 to 9, wherein the one or more processors are further configured to: in response to the user input, move the content placement indicator within the first space prior to rendering the content placement indicator on the second space.

Aspect 11. The apparatus of any of Aspects 1 to 10, wherein, to determine the at least one surface plane in the scene, the one or more processors are configured to: determine one or more surfaces of the one or more objects in the scene; and determine the at least one surface plane based on the one or more surfaces of the one or more objects in the scene.

Aspect 12. The apparatus of Aspect 11, wherein, to determine the at least one surface plane in the scene, the one or more processors are further configured to: apply an offset to the at least one surface plane normally to at least one surface and toward a view point of a user associated with the apparatus.

Aspect 13. The apparatus of any of Aspects 1 to 12, wherein, to determine the at least one surface plane in the scene, the one or more processors are configured to: determine one or more edges of the one or more objects in the scene; and determine the at least one surface plane based on the one or more edges of the one or more objects in the scene.

Aspect 14. The apparatus of any of Aspects 1 to 13, wherein, to render the content placement indicator, the one or more processors are configured to render a pattern on the at least one surface plane.

Aspect 15. The apparatus of Aspect 14, wherein the pattern comprises at least one of a highlight, an outline, a color, a shade, a shadow, a hatching, and a gradient.

Aspect 16. The apparatus of any of Aspects 1 to 15, wherein the apparatus comprises a mobile device.

Aspect 17. The apparatus of Aspect 16, wherein the mobile device comprises an extended reality device.

Aspect 18. The apparatus of any of Aspects 1 to 17, wherein the first space and the second space comprise spaces on the at least one surface plane that are at least one of unoccupied by any physical objects and free from any physical objects that visually obstruct a visibility of respective portions of the at least one surface plane associated with the first space and the second space.

Aspect 19. The apparatus of any of Aspects 1 to 18, wherein the second space comprises an available space on the at least one surface plane that is occupied by one or more physical objects in the physical scene.

Aspect 20. The apparatus of any of Aspects 1 to 19, wherein the one or more processors are configured to: based on an aspect ratio of the virtual content item, determine that at least a threshold amount of the virtual content item does not fit within the second space; determine that at least the threshold amount of the virtual content item fits within the second space when the virtual content item is configured according to a different aspect ratio; configure the content placement indicator according to the different aspect ratio; and render the content placement indicator on the second space according to the different aspect ratio.

Aspect 21. The apparatus of Aspect 20, wherein the one or more processors are configured to: adjust the aspect ratio of the virtual content item to the different aspect ratio; and in response to an additional input requesting placement of the virtual content item on the second space, render the virtual content item in the different aspect ratio, the virtual content item being rendered on the second space and within the content placement indicator.

Aspect 22. The apparatus of any of Aspects 1 to 21, wherein, to determine the at least one surface plane in the scene, the one or more processors are configured to: determine one or more surfaces of the one or more objects in the scene; and determine the at least one surface plane based on the one or more surfaces of the one or more objects in the scene.

Aspect 23. The apparatus of Aspect 22, wherein the one or more processor are further configured to apply smoothing to the one or more surfaces of the one or more objects in the scene prior to determining the at least one surface plane based on the one or more surfaces of the one or more objects in the scene.

Aspect 24. The apparatus of Aspect 22, wherein, to determine the at least one surface plane in the scene, the one or more processors are configured to: align the at least one surface plane with at least one surface of the one or more surfaces of the one or more objects in the scene.

Aspect 25. The apparatus of any of Aspects 1 to 24, wherein the one or more processors are configured to: render the at least one surface plane relative to the at least one surface.

Aspect 26. The apparatus of Aspect 25, wherein, to render the at least one surface plane, the one or more processors are configured to: determine that an amount of flatness of the surface is below a threshold; and render the at least one surface plane a distance from one or more points on the surface associated with the at least one surface plane.

Aspect 27. The apparatus of Aspect 25, wherein, to render the at least one surface plane, the one or more processors are configured to: determine that a highest point of the surface is a first threshold distance above one or more other points of the surface; and render the at least one surface plane a second threshold distance above the highest point of the surface.

Aspect 28. The apparatus of any of Aspects 1 to 27, wherein, to render the content placement indicator, the one or more processors are configured to render a visual outline on the at least one surface plane.

Aspect 29. The apparatus of Aspect 28, wherein the visual outline comprises at least one of a frame or a bounding box.

Aspect 30. The apparatus of any of Aspects 28 to 29, wherein the one or more processors are further configured to render the visual outline in a perspective of the respective surface plane.

Aspect 31. The apparatus of any of Aspects 1 to 30, wherein, to render the first content placement indicator and/or the second content placement indicator, the one or more processors are configured to render a preview of the virtual content item on the at least one surface plane.

Aspect 32. A method for rendering virtual content in a scene of a physical environment, the method comprising: determining at least one surface plane in the scene of the physical environment; rendering, via a computing device, a virtual content item in a first perspective at a first location in the scene; rendering a content placement indicator associated with the virtual content item on a first space of the at least one surface plane, the content placement indicator indicating at least part of the first space for placement of the virtual content item; determining one or more locations of one or more objects on a surface associated with the at least one surface plane; and in response to a user input, rendering the content placement indicator on a second space of the at least one surface plane, wherein the second space of the at least one surface plane is determined based on the one or more locations and the user input, the content placement indicator indicating at least part of the second space for placement of the virtual content item.

Aspect 33. The method of Aspect 32, further comprising: in response to an additional user input requesting placement of the virtual content item on the second space, rendering the virtual content item in a second perspective at a second location in the scene based on the content placement indicator, the second location being within the second space.

Aspect 34. The method of Aspect 33, further comprising: determining the second perspective based on a perspective of the second space.

Aspect 35. The method of Aspect 33, further comprising: determining a first surface plane and a second surface plane of the at least one surface plane, the first space being associated with the first surface plane and the second space being associated with the second surface plane; and determining the second perspective based on a perspective of the second surface plane.

Aspect 36. The method of Aspect 35, wherein rendering the content placement indicator on the second space comprises: determining an overlap of the virtual content item with the second surface plane; and upon determination that the overlap exceeds a first threshold, switching to rendering the content placement indicator on the second space associated with the second surface plane.

Aspect 37. The method of any of Aspects 32 to 36, wherein the first space and the second space are associated with a first surface plane of the at least one surface plane, wherein the method further comprises: detecting one or more objects, wherein the one or more objects occlude at least part of the first surface plane; and segmenting the first surface plane into at least a first segment and a second segment based at least on an occluded part of the first surface plane; wherein the first space is associated with the first segment and the second space is associated with the second segment.

Aspect 38. The method of Aspect 37, wherein segmenting the first surface plane into at least the first segment and the second segment comprises determining a fit of the virtual content item rendered in a perspective of the first surface plane in the first segment and the second segment.

Aspect 39. The method of any of Aspects 37 to 38, further comprising changing an aspect ratio of the virtual content item between the first segment and the second segment.

Aspect 40. The method of any of Aspects 32 to 39, further comprising: prior to rendering the content placement indicator on the second space, rendering the virtual content item in a third perspective at a third location in the scene based on the content placement indicator, the third location being within the first space.

Aspect 41. The method of any of Aspects 32 to 40, further comprising: in response to the user input, moving the content placement indicator within the first space prior to rendering the content placement indicator on the second space.

Aspect 42. The method of any of Aspects 32 to 41, wherein determining the at least one surface plane in the scene comprises: determining one or more surfaces of the one or more objects in the scene; and determining the at least one surface plane based on the one or more surfaces of the one or more objects in the scene.

Aspect 43. The method of Aspect 42, wherein determining the at least one surface plane in the scene comprises: applying an offset to the at least one surface plane normally to at least one surface and toward a view point of a user associated with the computing device.

Aspect 44. The method of any of Aspects 32 to 43, wherein determining the at least one surface plane in the scene comprises: determining one or more edges of the one or more objects in the scene; and determining the at least one surface plane based on the one or more edges of the one or more objects in the scene.

Aspect 45. The method of any of Aspects 32 to 44, wherein rendering the content placement indicator comprises rendering a pattern on the at least one surface plane.

Aspect 46. The method of Aspect 45, wherein the pattern comprises at least one of a highlight, an outline, a color, a shade, a shadow, a hatching, and a gradient.

Aspect 47. The method of any of Aspects 32 to 46, wherein the first space and the second space comprise spaces on the at least one surface plane that are at least one of unoccupied by any physical objects and free from any physical objects that visually obstruct a visibility of respective portions of the at least one surface plane associated with the first space and the second space.

Aspect 48. The method of any of Aspects 32 to 47, wherein the second space comprises an available space on the at least one surface plane that is occupied by one or more physical objects in the physical scene.

Aspect 49. The method of any of Aspects 32 to 48, further comprising: based on an aspect ratio of the virtual content item, determining that at least a threshold amount of the virtual content item does not fit within the second space; determining that at least the threshold amount of the virtual content item fits within the second space when the virtual content item is configured according to a different aspect ratio; configuring the content placement indicator according to the different aspect ratio; and rendering the content placement indicator on the second space according to the different aspect ratio.

Aspect 50. The method of Aspect 49, further comprising: adjusting the aspect ratio of the virtual content item to the different aspect ratio; and in response to an additional input requesting placement of the virtual content item on the second space, rendering the virtual content item in the different aspect ratio, the virtual content item being rendered on the second space and within the content placement indicator.

Aspect 51. The method of any of Aspects 32 to 50, wherein determining the at least one surface plane in the scene comprises: determining one or more surfaces of the one or more objects in the scene; and determining the at least one surface plane based on the one or more surfaces of the one or more objects in the scene.

Aspect 52. The method of Aspect 51, further comprising applying smoothing to the one or more surfaces of the one or more objects in the scene prior to determining the at least one surface plane based on the one or more surfaces of the one or more objects in the scene.

Aspect 53. The method of Aspect 51, wherein determining the at least one surface plane in the scene comprises: aligning the at least one surface plane with at least one surface of the one or more surfaces of the one or more objects in the scene.

Aspect 54. The method of any of Aspects 32 to 53, further comprising: rendering the at least one surface plane relative to the surface.

Aspect 55. The method of Aspect 54, wherein rendering the at least one surface plane comprises: determining that an amount of flatness of the surface is below a threshold; and rendering the at least one surface plane a distance from one or more points on the surface associated with the at least one surface plane.

Aspect 56. The method of Aspect 54, wherein rendering the at least one surface plane comprises: determining that a highest point of the surface is a first threshold distance above one or more other points of the surface; and rendering the at least one surface plane a second threshold distance above the highest point of the surface.

Aspect 57. The method of any of Aspects 32 to 56, wherein rendering the content placement indicator comprises rendering a visual outline on the at least one surface plane.

Aspect 58. The method of Aspect 57, wherein the visual outline comprises at least one of a frame or a bounding box.

Aspect 59. The method of any of Aspects 57 to 58, further comprising rendering the visual outline in a perspective of the respective surface plane.

Aspect 60. The method of any of Aspects 32 to 59, wherein rendering the content placement indicator comprises rendering a preview of the virtual content item on the at least one surface plane.

Aspect 61. An apparatus comprising means for performing a method according to any of Aspects 32 to 59.

Aspect 62. A non-transitory computer-readable medium having stored thereon instructions that, when executed by one or more processors, cause the one or more processors to perform a method according to any of Aspects 32 to 59.

Aspect 63. A method for rendering virtual content in a scene of a physical environment, the method comprising: determining at least one surface plane in the scene of the physical environment; determining that an amount of flatness of a surface associated with the at least one surface is below a threshold; rendering the at least one surface plane a distance from one or more points on the surface associated with the at least one surface plane; rendering a content placement indicator associated with a virtual content item on a first space of the at least one surface plane, the content placement indicator indicating at least part of the first space for placement of the virtual content item; and rendering, via a computing device, the virtual content item in a first perspective at a first location in the scene associated with the first space of the at least one surface.

Aspect 64. An apparatus comprising means for performing a method according to Aspect 63.

Aspect 65. A non-transitory computer-readable medium having stored thereon instructions that, when executed by one or more processors, cause the one or more processors to perform a method according to Aspect 63.

What is claimed is:

1. An apparatus for rendering virtual content in a scene of a physical environment, the apparatus comprising:
   memory; and
   one or more processors coupled to the memory, the one or more processors being configured to:
   determine at least one surface plane in the scene of the physical environment;
   render a virtual content item in a first perspective at a first location in the scene;
   render a content placement indicator associated with the virtual content item on a first space of the at least one surface plane, the content placement indicator indicating at least part of the first space for placement of the virtual content item;
   determine one or more locations of one or more objects on a surface associated with the at least one surface plane;
   in response to a user input, render the content placement indicator on a second space of the at least one surface plane, wherein the second space of the at least one surface plane is determined based on the one or more locations and the user input, the content placement indicator indicating at least part of the second space for placement of the virtual content item; and
   in response to an additional user input requesting placement of the virtual content item on the second space, render the virtual content item in a second perspective at a second location in the scene based on the content placement indicator, the second location being within the second space.

2. The apparatus of claim 1, wherein the one or more processors are further configured to:
   determine the second perspective based on a perspective of the second space.

3. The apparatus of claim 1, wherein the one or more processors are further configured to:
   determine a first surface plane and a second surface plane of the at least one surface plane, the first space being associated with the first surface plane and the second space being associated with the second surface plane; and
   determine the second perspective based on a perspective of the second surface plane.

4. The apparatus of claim 3, wherein, to render the content placement indicator on the second space, the one or more processors are configured to:
   determine an overlap of the virtual content item with the second surface plane; and
   upon determination that the overlap exceeds a first threshold, switch to rendering the content placement indicator on the second space associated with the second surface plane.

5. The apparatus of claim 1, wherein the first space and the second space are associated with a first surface plane of the at least one surface plane; and
   wherein the one or more processors are further configured to:
   detect one or more objects, wherein the one or more objects occlude at least part of the first surface plane; and
   segment the first surface plane into at least a first segment and a second segment based at least on an occluded part of the first surface plane;
   wherein the first space is associated with the first segment and the second space is associated with the second segment.

6. The apparatus of claim 5, wherein to segment the first surface plane into at least the first segment and the second segment, the one or more processors are configured to determine a fit of the virtual content item rendered in a perspective of the first surface plane in the first segment and the second segment.

7. The apparatus of claim 6, wherein the one or more processors are further configured to change an aspect ratio of the virtual content item between the first segment and the second segment.

8. The apparatus of claim 1, wherein the one or more processors are configured to:
prior to rendering the content placement indicator on the second space, render the virtual content item in a third perspective at a third location in the scene based on the content placement indicator, the third location being within the first space.

9. The apparatus of claim 1, wherein the one or more processors are further configured to:
in response to the user input, move the content placement indicator within the first space prior to rendering the content placement indicator on the second space.

10. The apparatus of claim 1, wherein, to determine the at least one surface plane in the scene, the one or more processors are configured to:
determine one or more surfaces of the one or more objects in the scene; and
determine the at least one surface plane based on the one or more surfaces of the one or more objects in the scene.

11. The apparatus of claim 10, wherein, to determine the at least one surface plane in the scene, the one or more processors are further configured to:
apply an offset to the at least one surface plane normally to at least one surface and toward a view point of a user associated with the apparatus.

12. The apparatus of claim 1, wherein, to determine the at least one surface plane in the scene, the one or more processors are configured to:
determine one or more edges of the one or more objects in the scene; and
determine the at least one surface plane based on the one or more edges of the one or more objects in the scene.

13. The apparatus of claim 1, wherein, to render the content placement indicator, the one or more processors are configured to render a pattern on the at least one surface plane.

14. The apparatus of claim 13, wherein the pattern comprises at least one of a highlight, an outline, a color, a shade, a shadow, a hatching, and a gradient.

15. The apparatus of claim 1, wherein the apparatus comprises a mobile device.

16. The apparatus of claim 15, wherein the mobile device comprises an extended reality device.

17. A method for rendering virtual content in a scene of a physical environment, the method comprising:
determining at least one surface plane in the scene of the physical environment;
rendering, via a computing device, a virtual content item in a first perspective at a first location in the scene;
rendering a content placement indicator associated with the virtual content item on a first space of the at least one surface plane, the content placement indicator indicating at least part of the first space for placement of the virtual content item;
determining one or more locations of one or more objects on a surface associated with the at least one surface plane;
in response to a user input, rendering the content placement indicator on a second space of the at least one surface plane, wherein the second space of the at least one surface plane is determined based on the one or more locations and the user input, the content placement indicator indicating at least part of the second space for placement of the virtual content item; and
in response to an additional user input requesting placement of the virtual content item on the second space, rendering the virtual content item in a second perspective at a second location in the scene based on the content placement indicator, the second location being within the second space.

18. The method of claim 17, further comprising:
determining the second perspective based on a perspective of the second space.

19. The method of claim 17, further comprising:
determining a first surface plane and a second surface plane of the at least one surface plane, the first space being associated with the first surface plane and the second space being associated with the second surface plane; and
determining the second perspective based on a perspective of the second surface plane.

20. The method of claim 19, wherein rendering the content placement indicator on the second space comprises:
determining an overlap of the virtual content item with the second surface plane; and
upon determination that the overlap exceeds a first threshold, switching to rendering the content placement indicator on the second space associated with the second surface plane.

21. The method of claim 17, wherein the first space and the second space are associated with a first surface plane of the at least one surface plane, wherein the method further comprises:
detecting one or more objects, wherein the one or more objects occlude at least part of the first surface plane; and
segmenting the first surface plane into at least a first segment and a second segment based at least on an occluded part of the first surface plane;
wherein the first space is associated with the first segment and the second space is associated with the second segment.

22. The method of claim 21, wherein segmenting the first surface plane into at least the first segment and the second segment comprises determining a fit of the virtual content item rendered in a perspective of the first surface plane in the first segment and the second segment.

23. The method of claim 22, further comprising changing an aspect ratio of the virtual content item between the first segment and the second segment.

24. The method of claim 17, further comprising:
prior to rendering the content placement indicator on the second space, rendering the virtual content item in a third perspective at a third location in the scene based on the content placement indicator, the third location being within the first space.

25. The method of claim 17, further comprising:
in response to the user input, moving the content placement indicator within the first space prior to rendering the content placement indicator on the second space.

26. The method of claim 17, wherein determining the at least one surface plane in the scene comprises:
  determining one or more surfaces of the one or more objects in the scene; and
  determining the at least one surface plane based on the one or more surfaces of the one or more objects in the scene.

27. The method of claim 26, wherein determining the at least one surface plane in the scene comprises:
  applying an offset to the at least one surface plane normally to at least one surface and toward a view point of a user associated with the computing device.

28. The method of claim 17, wherein determining the at least one surface plane in the scene comprises:
  determining one or more edges of the one or more objects in the scene; and
  determining the at least one surface plane based on the one or more edges of the one or more objects in the scene.

29. The method of claim 17, wherein rendering the content placement indicator comprises rendering a pattern on the at least one surface plane.

30. The method of claim 29, wherein the pattern comprises at least one of a highlight, an outline, a color, a shade, a shadow, a hatching, and a gradient.

31. A non-transitory computer-readable medium including instructions that, when executed by at least one processor, cause the at least one processor to:
  determine at least one surface plane in a scene of a physical environment;
  render, via a computing device, a virtual content item in a first perspective at a first location in the scene;
  render a content placement indicator associated with the virtual content item on a first space of the at least one surface plane, the content placement indicator indicating at least part of the first space for placement of the virtual content item;
  determine one or more locations of one or more objects on a surface associated with the at least one surface plane;
  in response to a user input, render the content placement indicator on a second space of the at least one surface plane, wherein the second space of the at least one surface plane is determined based on the one or more locations and the user input, the content placement indicator indicating at least part of the second space for placement of the virtual content item; and
  in response to an additional user input requesting placement of the virtual content item on the second space, render the virtual content item in a second perspective at a second location in the scene based on the content placement indicator, the second location being within the second space.

32. The non-transitory computer-readable medium of claim 31, wherein, to render the content placement indicator on the second space, the instructions, when executed by the at least one processor, cause the at least one processor to:
  determine an overlap of the virtual content item with a second surface plane; and
  upon determination that the overlap exceeds a first threshold, switch to rendering the content placement indicator on the second space associated with the second surface plane.

* * * * *